(12) United States Patent
Kim et al.

(10) Patent No.: US 6,490,267 B1
(45) Date of Patent: Dec. 3, 2002

(54) DEVICE AND METHOD FOR GENERATING SPREADING CODE AND SPREADING CHANNEL SIGNALS USING SPREADING CODE IN A CDMA COMMUNICATION SYSTEM

(75) Inventors: Je-Woo Kim, Kyonggi-do (KR); Jung-Hyo Woo, Pusankwangyok-shi (KR); Chang-Soo Park, Seoul (KR); Jae-Min Ahn, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/407,537

(22) Filed: Sep. 29, 1999

(30) Foreign Application Priority Data

Sep. 29, 1998 (KR) .......................... 1998-40507

(51) Int. Cl.[7] .............................................. H04B 7/216
(52) U.S. Cl. ...................... 370/342; 370/335; 375/146; 375/140
(58) Field of Search ................... 370/335, 342, 370/320, 441; 375/140, 145, 146, 149

(56) References Cited

U.S. PATENT DOCUMENTS

| | | | | |
|---|---|---|---|---|
| 5,228,054 A | * | 7/1993 | Rueth et al. ............... | 375/1 |
| 5,309,474 A | * | 5/1994 | Gilhousen et al. ......... | 375/1 |
| 5,400,359 A | * | 3/1995 | Hikoso et al. ............. | 375/1 |
| 5,483,550 A | * | 1/1996 | Hulbert ..................... | 375/202 |
| 5,712,869 A | * | 1/1998 | Lee et al. .................. | 375/206 |

OTHER PUBLICATIONS

Ojanpera and Ramjee, Wilde Band CDMA for Third Generation Mobil Communications, copyright 1998, Artech House Publishers, pp. 51–55, 115–119, and 173–174.*

Rappaport, Wireless Communications, copyright 1996, Prentice Hall PTR, pp. 242–251.*

* cited by examiner

*Primary Examiner*—Nay Maung
*Assistant Examiner*—Tanmay Lele
(74) *Attorney, Agent, or Firm*—Dilworth & Barrese, LLP

(57) ABSTRACT

A spreading code generating device for a Code Division Multiple Access (CDMA) communication system. The device comprises a PN (Pseudorandom Noise) code sequence generator for generating $PN_i$ and $PN_q$ sequences; an orthogonal code generator for generating first and second orthogonal codes which perform Differential Phase Shift Keying (DPSK) state transitions at intervals of at least two chips; and a spreading code generator for generating spreading codes $C_i$ and $C_q$ by mixing the $PN_i$ and $PN_q$ code sequences with the first and second orthogonal codes such that a present phase of the spreading codes $C_i$ and $C_q$ alternately makes Quadrature Phase Shift Keying (QPSK) and DPSK state transitions with respect to a previous phase of the spreading codes $C_i$ and $C_q$.

27 Claims, 20 Drawing Sheets

DEVICE AND METHOD FOR GENERATING SPREADING CODE AND SPREADING CHANNEL SIGNALS USING SPREADING CODE IN A CDMA COMMUNICATION SYSTEM

PRIORITY

This application claims priority to an application entitled "Device and Method for Generating Spreading Code and Spreading Channel Signals Using Spreading Code in CDMA Communication System" filed in the Korean Industrial Property Office on Sept. 29, 1998 and assigned Ser. No. 98-40507, the contents of which are hereby incorporated by reference.

BACKGROUND OF THE INVENTION

1. Field of the Invention

The present invention relates generally to a spread spectrum device and method for a CDMA communication system, and in particular, to a device and method for generating spreading sequences.

2. Description of the Related Art

Code Division Multiple Access (CDMA) mobile communication systems have developed from an existing mobile communication standard which mainly provides voice service into the IMT-2000 standard which can provide not only voice service but also high speed data transmission service. For example, the IMT-2000 standard can provide high quality voice, moving picture, and Internet search services. In CDMA communication systems, communication links between a base station and a mobile station include a forward link for transmitting from the base station to the mobile station and a reverse link for transmitting from the mobile station to the base station.

In CDMA communication systems, the reverse link typically employs a PN (Pseudorandom Noise) code complex spreading scheme as the spread spectrum method. However, the PN code complex spreading scheme has a problem when the power amplifier has an increase in the peak-to-average power ratio (PAR) because of user data. In the reverse link, an increase in the peak-to-average ratio of transmission power causes 're-growth,' described below, which affects the design and performance of the power amplifier in the mobile stations. The characteristic curve of the power amplifier in the mobile station has a linear area and a non-linear area. When the transmission power of the mobile station increases, the signal of the mobile station will enter the non-linear area, interfering with the frequency areas of other users, which is called the "re-growth" phenomenon. In order not to interfere with the frequency areas of the other users, the cell area should be reduced in size and mobile stations in a cell area should transmit to the corresponding base station at a lower transmission power. Therefore, there is a need for a spreading method which decreases PAR while minimizing the degradation of bit error rate (BER) performance which affects the overall system performance.

A description of the PN complex spreading scheme will be made herein below with reference to a transmitter in a conventional CDMA communication system.

FIG. 1 illustrates a channel transmitter, including a spread spectrum device, for a CDMA communication system. As illustrated, the channel transmitter includes an orthogonal spreader 101, a complex multiplier 102, a PN sequence generator 103 and a lowpass filtering and modulation part 104.

Referring to FIG. 1, the transmission data of each channel is applied to the orthogonal spreader 101 after channel coding, repetition and interleaving through corresponding channel coders (not shown). The orthogonal spreader 101 then multiplies the input channel data by a unique orthogonal code assigned to the corresponding channel to orthogonally spread the input channel data. Walsh codes are typically used for the orthogonal codes. The PN sequence generator 103 generates spreading sequences for spreading the transmission signals of the respective channels. PN sequences are typically used for the spreading sequences. The complex multiplier 102 complex multiplies the signals output from the orthogonal spreader 101 by the spreading sequences output from the PN sequence generator 103 to generate complex spread signals. The lowpass filtering and modulation part 104 baseband filters the complex spread signals output from the complex multiplier 102 and then converts the baseband filtered signals to RF (Radio Frequency) signals.

FIG. 2 is a detailed diagram illustrating the channel transmitter of FIG. 1 for the reverse link.

Referring to FIG. 2, the transmission data of each channel undergoes channel coding, repeating, channel interleaving and binary mapping in such a manner that a signal "0" is mapped to "+1" and a signal "1" to "−1", prior to being input to the corresponding channel. The data of the respective channels is multiplied by unique orthogonal codes in multipliers 111, 121, 131 and 141. In FIG. 2, channel transmitters include a pilot channel transmitter, a control channel transmitter, a supplemental channel transmitter and a fundamental channel transmitter. As stated above, Walsh codes are typically used for the orthogonal codes that spread the respective channels. The orthogonally spread data of the control channel, the supplemental channel and the fundamental channel is multiplied by gains appropriate for each channel by the first to third gain controllers 122, 132 and 142. The channel data is added by binary adders 112 and 133 and then applied to the complex multiplier 102. Herein, the outputs of the binary adders 112 and 133 will be referred to as "channelized data".

The complex multiplier 102 multiplies the outputs of the adders 112 and 133 by spreading codes to perform spreading. As stated above, the PN codes output from the PN sequence generator 103 are used for the spreading codes. The PN codes input to the complex multiplier 102 have a rate equal to a chip rate and may have a value comprised of "+1" and "−1". Herein, unless otherwise stated, the PN codes are assumed to have a value of "+1" and "−1".

With regard to the complex multiplier 102, channelized data output from the adder 112 is applied to multipliers 113 and 143, and channelized data output from the adder 133 is applied to multipliers 123 and 134. Further, a spreading code $PN_i$ output from the PN sequence generator 103 is applied to the multipliers 113 and 123 and a spreading code $PN_q$ output from the PN sequence generator 103 is applied to the multipliers 134 and 143. In addition, outputs of the multipliers 113 and 134 are subtracted from each other by an adder 114 and then applied to a first lowpass filter 115; and outputs of the multipliers 123 and 143 are added to each other by an adder 135 and then applied to a second lowpass filter 136.

A real signal out of the outputs from the binary adder 114 is input to the first lowpass filter 115 and an imaginary signal is input to the second lowpass filter 136. Output signals of the lowpass filters 115 and 136 are gain controlled by fourth and fifth gain controllers 116 and 137, respectively, then modulated, added together, and transmitted through a transmission channel. The lowpass filtering and modulation part 104 lowpass filters and modulates the output data of the binary adders 114 and 135, and then outputs the modulated data from a binary adder 118.

Several methods have been proposed for reducing the PAR of the signals output from the first and second lowpass filters 115 and 136, and those methods are based on how the PN sequence generator 103 generates the spreading codes $PN_i$ and $PN_q$. In general, the peak-to-average power ratio PAR depends on both zero-crossings, which occur when the signs of $PN_i$ and $PN_q$ are simultaneously changed, and hold-phase-state, which occurs when the signs of both $PN_i$ and $PN_q$ are not changed. More specifically, zero-crossings (ZC) happen when, for example, an initial state in the first quadrant transitions to the third quadrant, causing a phase shift of $\pi$. Further, a hold-phase-state, or "hold," happens when, for example, an initial state in the first quadrant remains in the first quadrant, causing no phase shift.

As stated above, in conventional QPSK (Quadrature Phase Shift Keying) spreading, a phase of the generated spreading codes can transition from the first quadrant to any of the second, third and fourth quadrants according to the value of the PN codes. Accordingly, when the conventional spreading code generation method is used, the PAR performance may deteriorate due to the zero-crossing phenomenon and the hold-phase-state phenomenon. Therefore, in a CDMA communication system, during spreading, the PAR is increased depending on the $PN_i$ and $PN_q$.

SUMMARY OF THE INVENTION

It is, therefore, an object of the present invention to provide a device and method for generating a spreading sequence which can decrease the peak-to-average power ratio without degrading BER performance in a CDMA communication system.

It is another object of the present invention to provide a device and method for repeatedly generating a QPSK and $\pi/2$-DPSK (Differential Phase Shift Keying) phase-shifted PN sequence as a spreading sequence in a CDMA communication system.

It is further another object of the present invention to provide a device and method for generating a QPSK, $\pi/2$-DPSK, and zero-crossing or hold phase-shifted PN sequence as a spreading sequence in a CDMA communication system.

It is still another object of the present invention to provide a device and method for generating a spreading sequence which alternately performs a DPSK phase shift and a QPSK phase shift by mixing a PN sequence with a specific orthogonal code in a CDMA communication system.

It is yet another object of the present invention to provide a device and method for generating a DPSK and QPSK phase-shifted spreading sequence by mixing a generated PN sequence with a previous spreading sequence, and generating a spreading sequence which alternately performs a DPSK phase shift and a QPSK phase shift by selecting a generated spreading sequence, in a CDMA communication system.

It is yet another object of the present invention to provide a device and method for generating a spreading sequence which repeats the pattern of a QPSK phase shift, a DPSK phase shift, a zero-crossing or hold (ZCH), and a DPSK phase shift by mixing a PN sequence with a specific orthogonal code in a CDMA communication system.

It is yet another object of the present invention to provide a device and method for generating a QPSK phase shift, a DPSK phase shift, a 180° or 0° phase-shift (ZCH) spreading sequence by mixing a generated PN sequence with a previous spreading sequence, and generating a spreading sequence which repeatedly performs QPSK, DPSK, zero-crossing or hold, and DPSK phase shifts by selecting the generated spreading sequence, in a CDMA communication system.

It is yet another object of the present invention to provide a device and method for alternately generating a QPSK and $\pi/2$-DPSK phase-shifted PN sequence as a spreading sequence, and spreading/despreading a channel signal using the generated spreading sequence, in a CDMA communication system.

It is yet another object of the present invention to provide a device and method for generating a QPSK, $\pi/2$-DPSK, zero-crossing or hold phase-shifted PN sequence as a spreading code, and spreading/despreading a channel signal using the generated spreading sequence, in a CDMA communication system.

To achieve the above and other objects, a spreading code generating device is provided for a CDMA communication system. The device is comprised of a PN sequence generator for generating $PN_i$ and $PN_q$ sequences; an orthogonal code generator for generating first and second orthogonal codes which perform DPSK state transitions at intervals of at least two chips; and a spreading code generator for generating spreading codes $C_i$ and $C_q$ by mixing the $PN_i$ and $PN_q$ sequences with the first and second orthogonal codes such that the present phase of the spreading codes $C_i$ and $C_q$ alternately generates QPSK and DPSK state transitions with respect to the phase of the previous spreading codes $C_i$ and $C_q$.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail.

Figure 1:
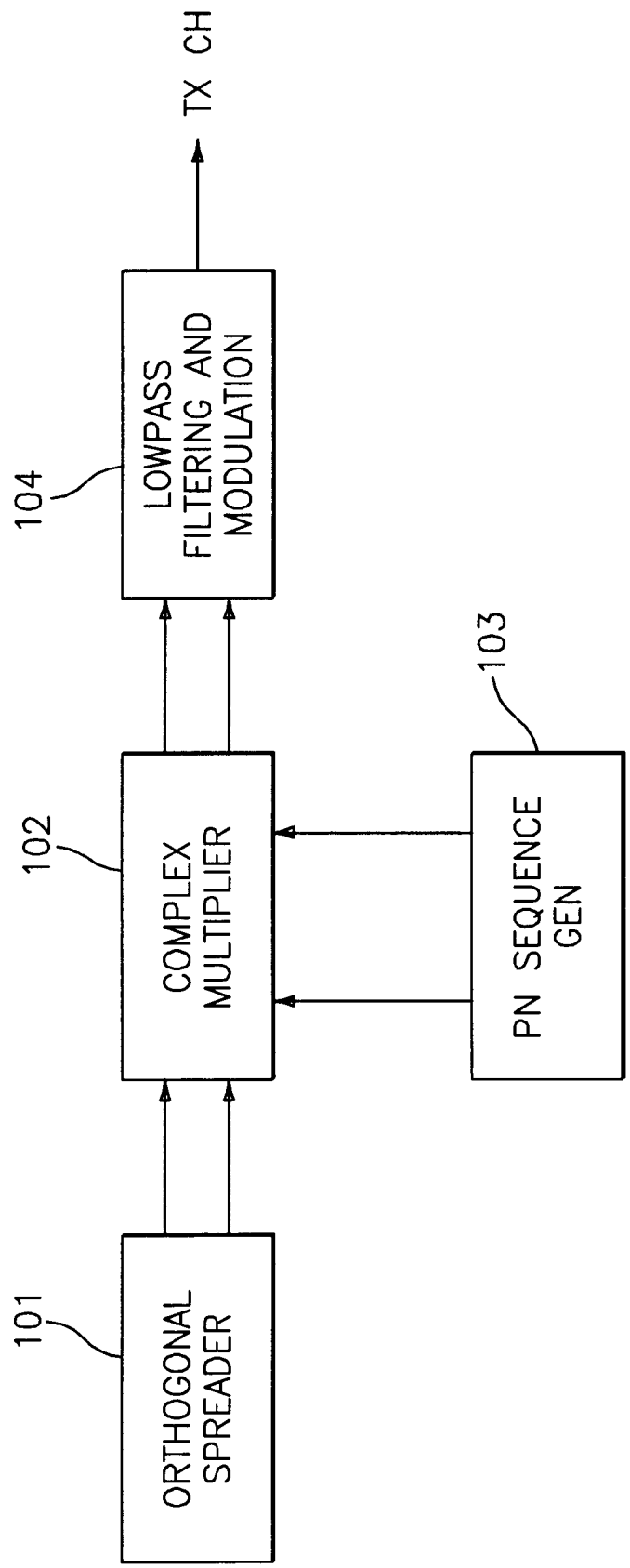
FIG. 1 is a block diagram illustrating a channel transmitter for a CDMA communication system.
Figure 2:
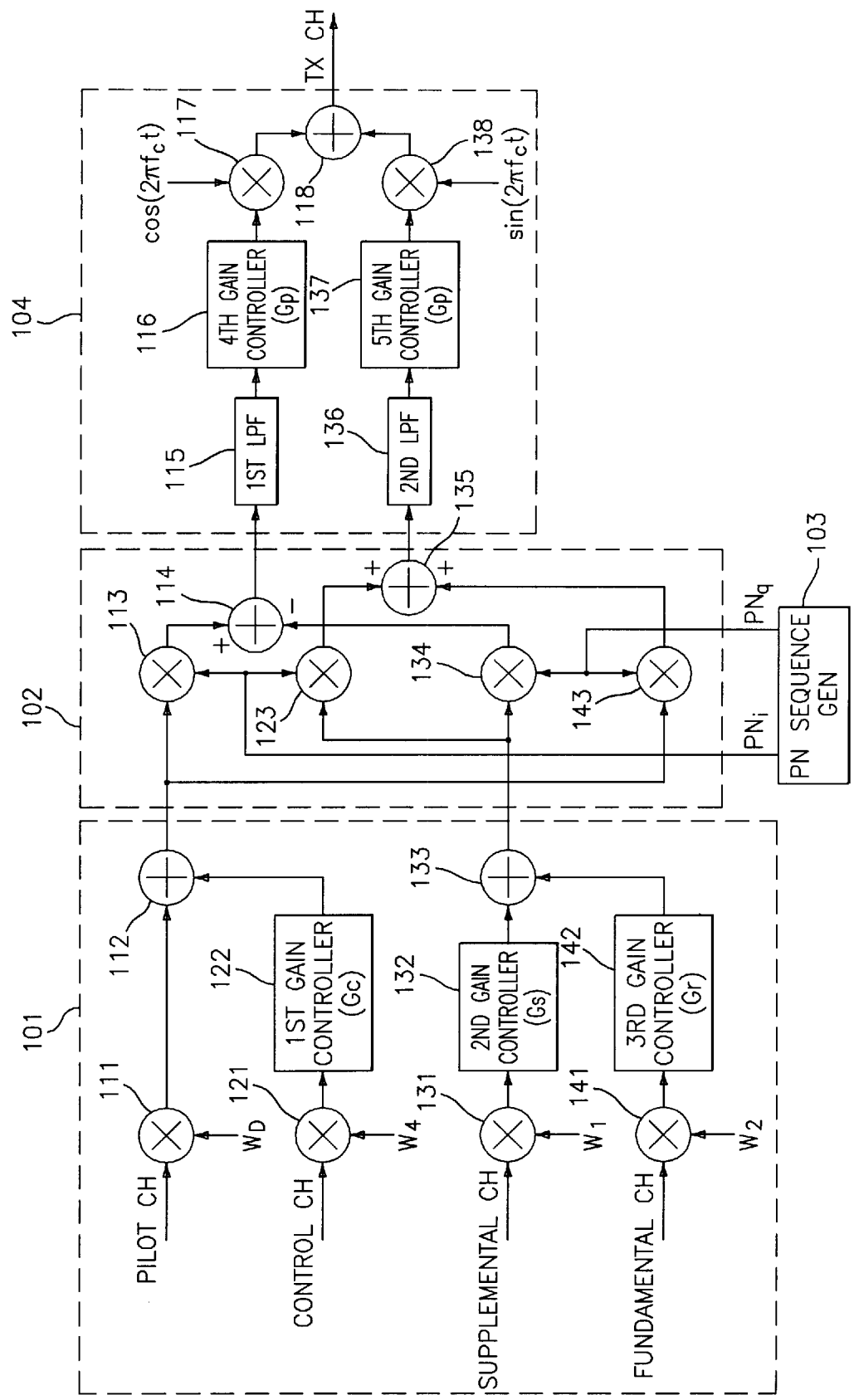
FIG. 2 is a detailed diagram of a reverse link channel transmitter for a CDMA communication system.
Figure 3:
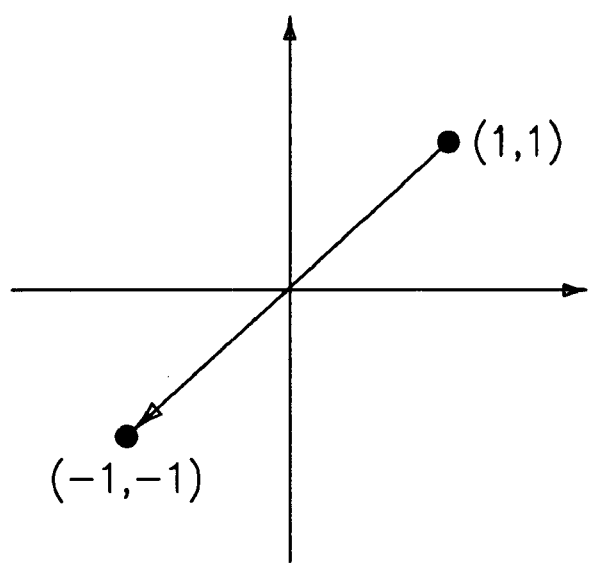
FIGS. 3 to 6 are diagrams illustrating primitive state transition for zero-crossing, hold, $+\pi/2$-DPSK and $-\pi/2$-DPSK, respectively.
Figure 4:
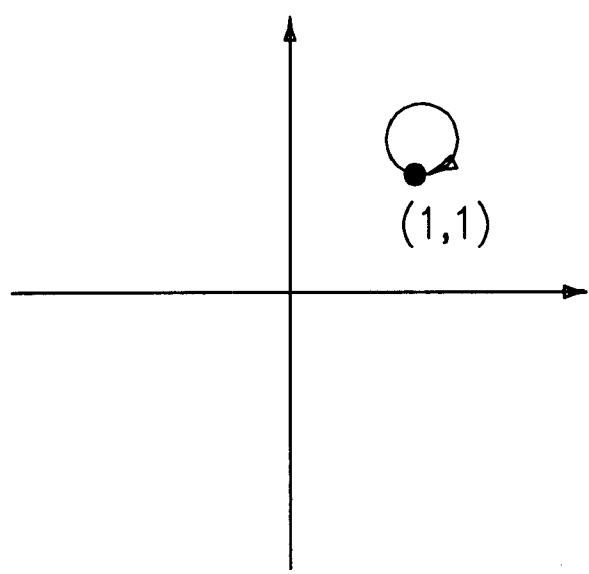
Figure 5:
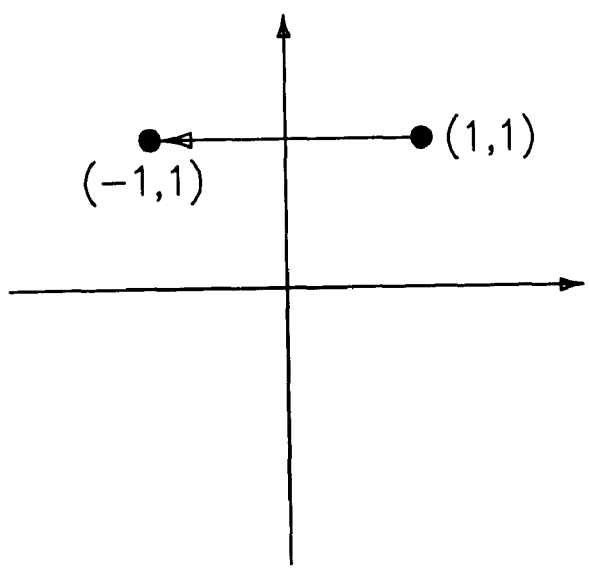
Figure 6:
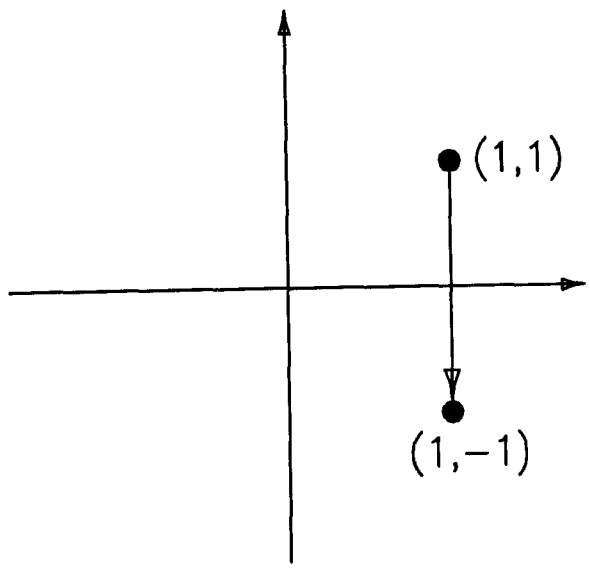

A description will be made below regarding the state transition characteristics of a spreading code. For convenience, it will be assumed that the initial state of the spreading code is placed in the first quadrant. FIGS. 3 to 6 illustrate primitive state transitions, wherein FIG. 3 illustrates a zero-crossing; FIG. 4 illustrates a hold; FIG. 5 illustrates a +π/2-DPSK; and FIG. 6 illustrates a −π/2-DPSK. The above state transitions can be implemented in various methods.

Conventional QPSK spreading (hereinafter, referred to as "Q" for short) is memoryless; in other words, a transition to the present state can be made to every quadrant regardless of the previous state. For example, assuming that the previous state has the value (1,1) in the first quadrant, the present state can take on the same value (1,1) in the first quadrant, a value (−1,1) of the second quadrant, a value (−1−1) of the third quadrant or a value (1−1) of the fourth quadrant.

The zero-crossing phenomenon, occurring when spreading sequences $C_i$ and $C_q$ generated from a spreading code generator simultaneously vary in sign, and the hold phenomenon, occurring when neither sign of the spreading sequences change, cause a degradation of PAR performance. Therefore, in the CDMA communication system, it is possible to improve the PAR performance by suppressing the zero-crossing and hold phenomena of the spreading codes $C_i$ and $C_q$ during spreading. In one embodiment of the present invention, a first method is provided which alternately performs QPSK and DPSK phase shifts in order to suppress the zero-crossing and hold phenomena of the spreading sequence. Then, although every phase shift to every state can occur in QPSK as shown in FIGS. 3 to 6, a DPSK phase shift is performed next, making it possible to prevent the zero-crossing and hold phenomena. A second method repeats a pattern of a QPSK, a DPSK, a zero-crossing or hold, and a DPSK phase shift for the spreading sequence. By using the above two methods, it is possible to prevent the zero-crossing and hold phenomenon of the spreading sequence, and suppress continuous zero-crossing or hold.

First, a description will be made regarding the first spreading sequence generation method according to an embodiment of the present invention.

Figure 7:
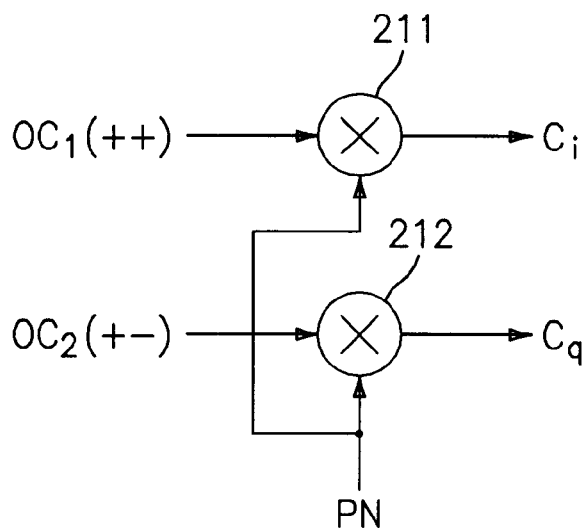
FIG. 7 is a diagram illustrating a $\pi/2$-DPSK spreading sequence generating scheme for a spread spectrum device in a CDMA communication system.

FIG. 7 illustrates a scheme for generating a ±π/2-DPSK (hereinafter referred to as "D" for short) spreading sequence using an orthogonal code in a CDMA communication system.

Referring to FIG. 7, a multiplier 211 multiplies an orthogonal code $OC_1$, by a PN code to generate a spreading code $C_i$, and a multiplier 212 multiplies an orthogonal code $OC_2$ by the PN code to generate a spreading code $C_q$. If the PN code is +1,−1,−1,+1,−1, and initial values of the orthogonal codes $OC_1$ and $OC_2$ are both +1, then the multiplier 211 outputs +1,−1,−1,+1,−1, and the multiplier 212 outputs +1,+1,−1,−1,−1. Therefore, the combined outputs ($C_i,C_q$) of the multipliers 211 and 212 become (+1,+1),(−1,+1),(−1,−1), (+1,−1),(−1,−1), so that the state transitions of the spreading codes are from an initial first quadrant, to the second quadrant, the third quadrant, the fourth quadrant and the third quadrant, causing a ±π/2 phase shift each time.

Figure 8:
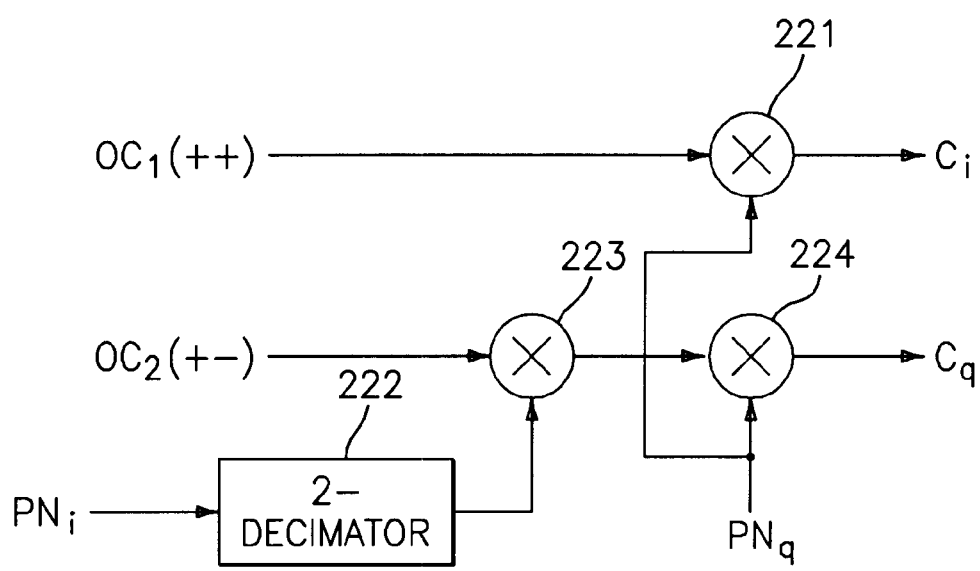
FIG. 8 is a diagram illustrating a QPSK, $\pi/2$-DPSK spreading sequence generating scheme for a spread spectrum device in a CDMA communication system.

FIG. 8 illustrates a QPSK, π/2-DPSK spreading sequence generating scheme in a spread spectrum device for a CDMA communication system.

Referring to FIG. 8, a 2-decimator 222 decimates $PN_i$, and a multiplier 223 multiplies an orthogonal code $OC_2$ by the output of the 2-decimator 222. A multiplier 221 multiplies an orthogonal code $OC_1$ by $PN_q$ to generate a spreading code $C_i$, and a multiplier 224 multiplies the output of the multiplier 223 by $PN_q$ to generate a spreading code $C_q$.

Figure 9:
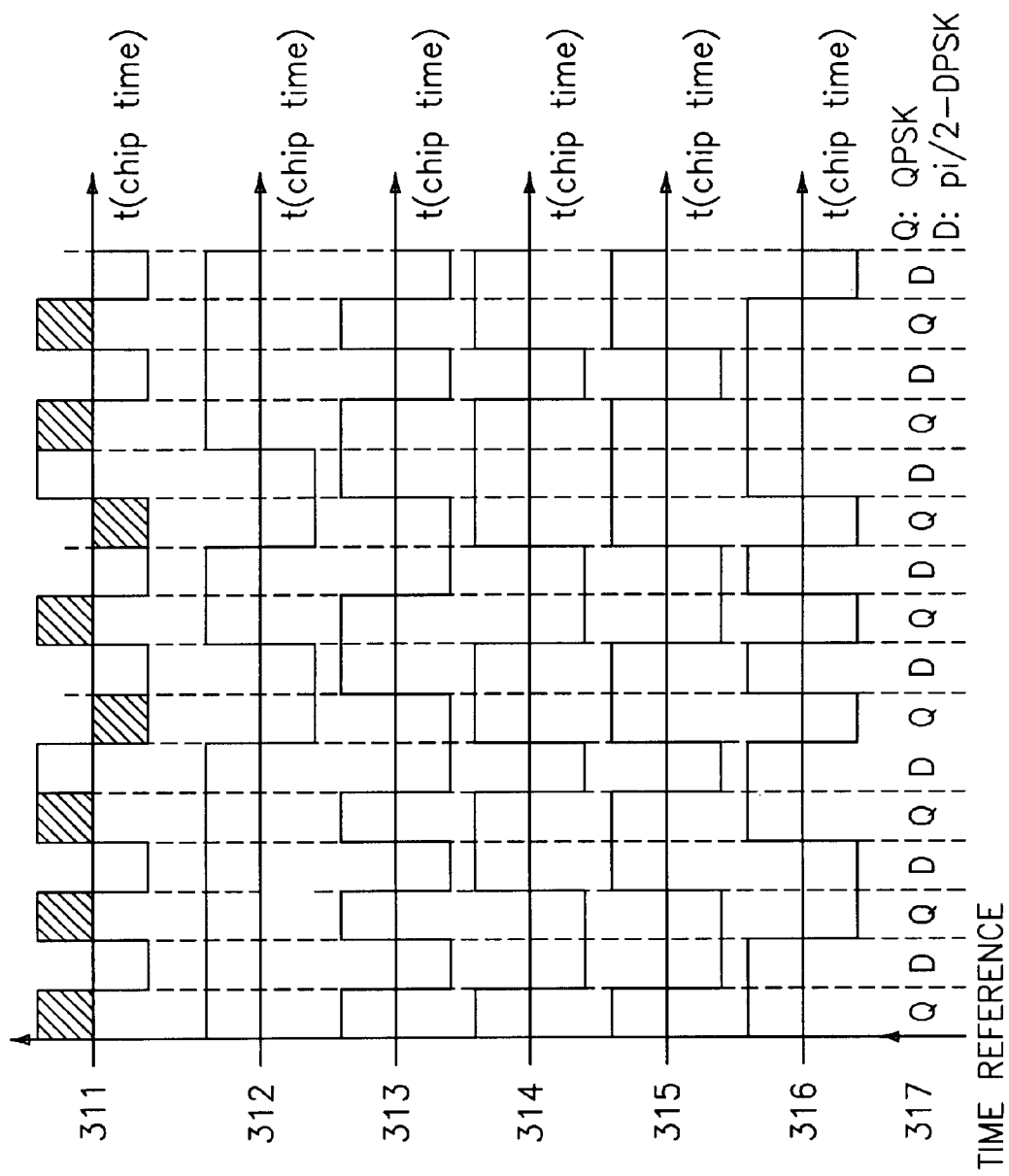
FIG. 9 is a timing diagram showing the generation of a QPSK, $\pi/2$-DPSK spreading sequence using the scheme of FIG. 8.

FIG. 9 is a timing diagram of the QPSK, π/2-DPSK spreading sequence scheme in FIG. 8. In FIG. 8, it is assumed that initial values of the orthogonal codes $OC_1$ and $OC_2$ are both +1. In FIG. 9, reference numeral 311 represents $PN_i$, reference numeral 312 represents $PN_i$ output from the 2-decimator 222, reference numeral 313 represents the output of the multiplier 223, reference numeral 314 represents $PN_q$, reference numeral 315 represents the spreading sequence $C_i$ output from the multiplier 221, reference numeral 316 represents the spreading sequence $C_q$ output from the multiplier 224, and reference numeral 317 represents state transition of the spreading codes.

Referring to FIGS. 8 and 9, the output of the multiplier 221 and the output of the multiplier 224 constitute the spreading codes $C_i$ and $C_q$, respectively. From reference numerals 315, 316 and 317, the spreading codes $C_i$ and $C_q$ become (+1,+1), (−1,+1), (−1,−1), (+1,−1), (+1,+1), (−1,+1), (+1,−1), (+1,+1), (−1,−1), (−1,+1), (+1,−1), (+1,+1), (+1,+

1), (−1,+1), (+1,+1), (+1,−1), so that the state transitions of the spreading codes are from an initial state to the first quadrant (Q transition), the second quadrant (D transition), the third quadrant (Q transition), the fourth quadrant (D transition), the first quadrant (Q transition), the second quadrant (D transition), the fourth quadrant (Q transition), the first quadrant (D transition), the third quadrant (Q transition), the second quadrant (D transition), the fourth quadrant (Q transition), the first quadrant (D transition), the first quadrant (Q transition), the second quadrant (D transition), the first quadrant (Q transition) and the fourth quadrant (D transition). That is, the spreading codes generated by the spreading code generator of FIG. 8 make the repeated state transitions between QPSK and π/2-DPSK as shown by reference numeral 317 of FIG. 9.

Figure 10:
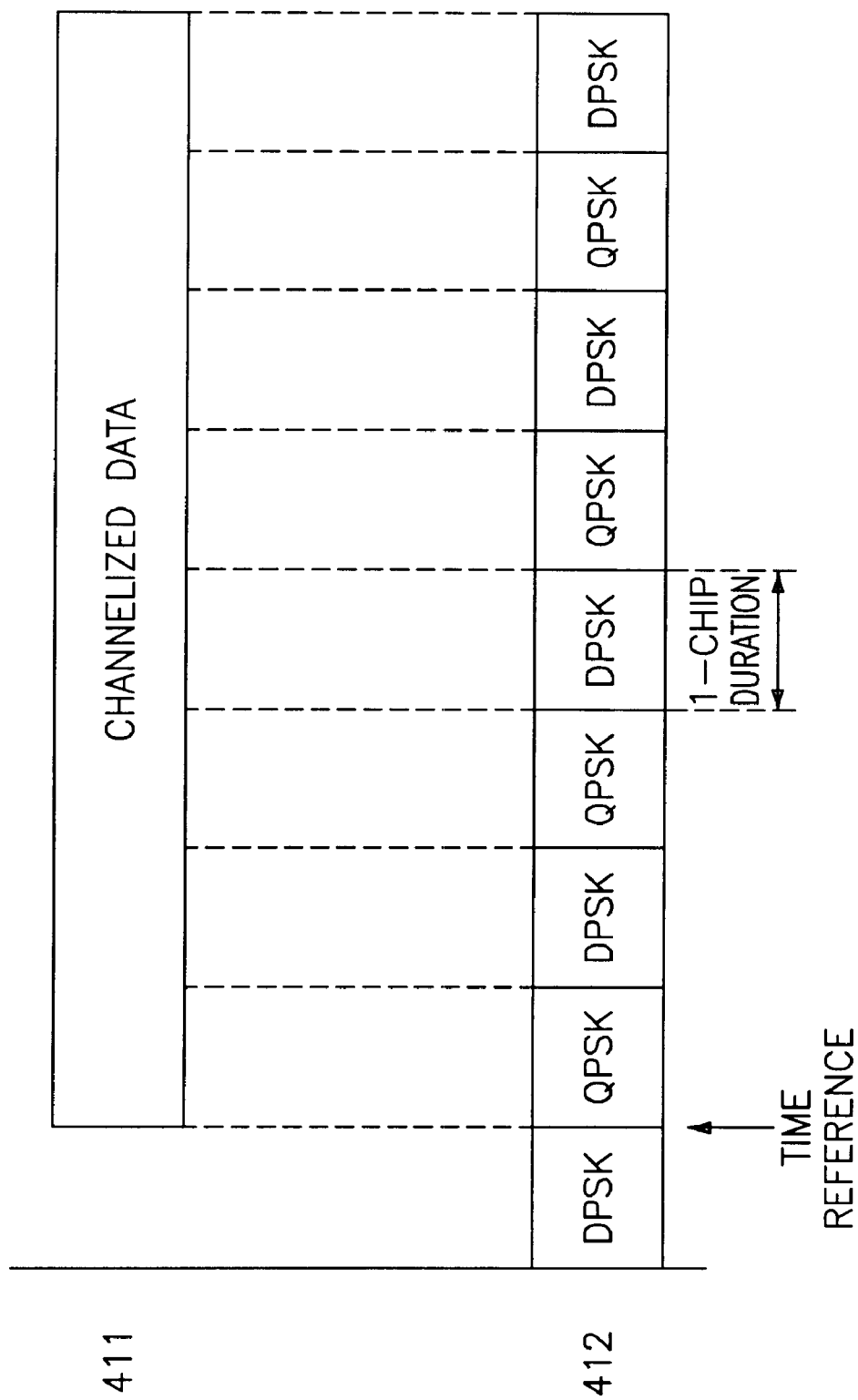
FIG. 10 is a timing diagram showing the QPSK, $\pi/2$-DPSK state transitions in a QPSK, $\pi/2$-DPSK spreading sequence generating scheme.

FIG. 10 is a timing diagram showing channelized data output from an orthogonal spreader and the output of a spreading code generator performing Q-D state transitions. In FIG. 10, reference numeral 411 represents channelized data output from an orthogonal spreader, which is input to a complex multiplier, and reference numeral 412 represents spreading codes output from a spreading code generator. Referring to FIG. 10, a spreading code making a QPSK state transition is input from the spreading code generator at the time when the channelized data is input to the complex multiplier, on the basis of a time reference.

Figure 11:
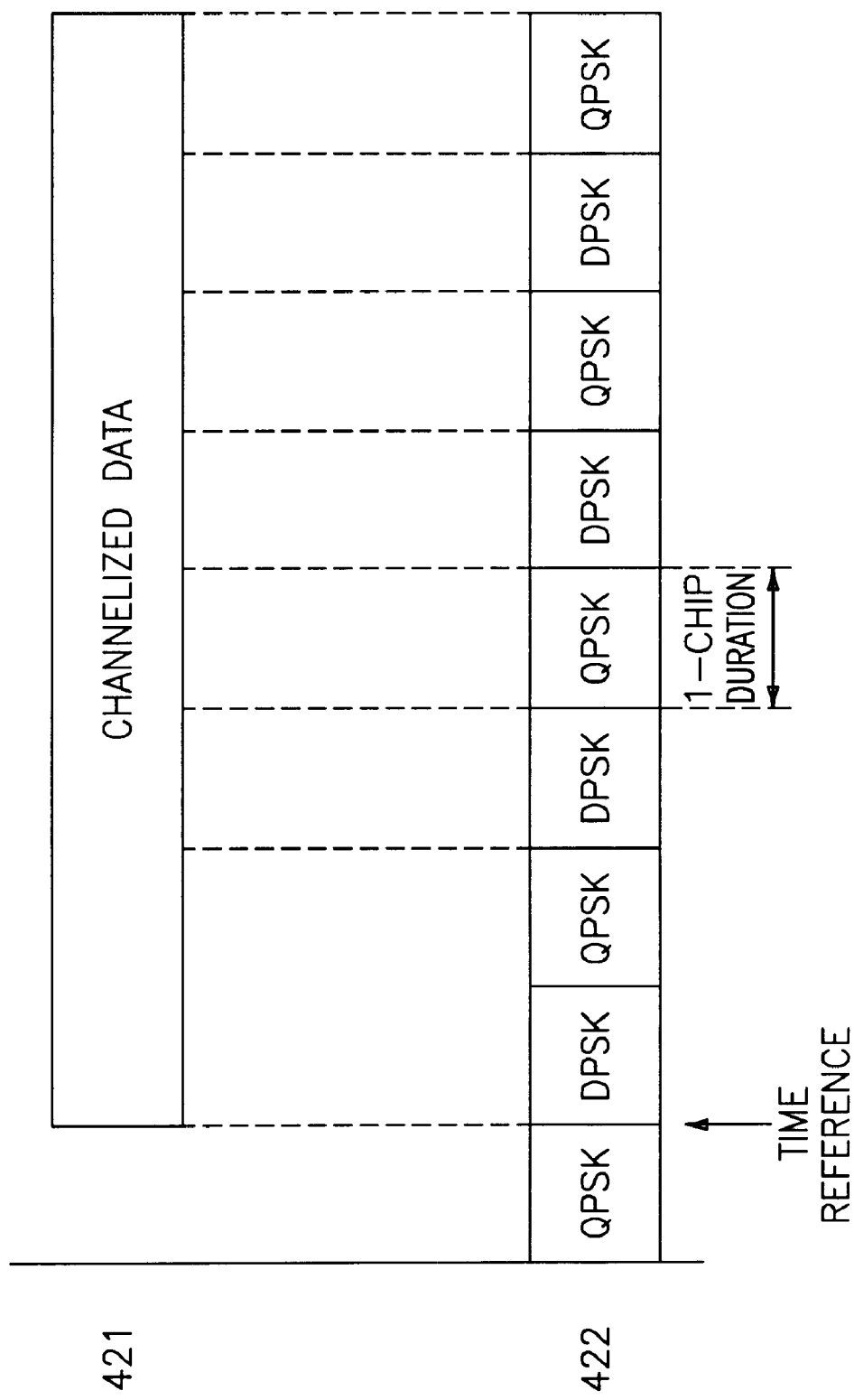
FIG. 11 is a timing diagram showing the $\pi/2$-DPSK, QPSK state transitions in a $\pi/2$-DPSK, QPSK spreading sequence generating scheme.

FIG. 11 is a timing diagram showing channelized data output from an orthogonal spreader and the output of a spreading code generator performing D-Q state transitions. In FIG. 11, reference numeral 421 represents channelized data output from an orthogonal spreader, which is input to a complex multiplier, and reference numeral 422 represents spreading codes output from a spreading code generator. Referring to FIG. 11, a spreading code making a π/2-DPSK state transition is input from the spreading code generator at the time when the channelized data is input to the complex multiplier, on the basis of a time reference.

Therefore, it is possible to implement a spreading code generator for generating a D-Q spreading sequence of FIG. 11, using the same spreading code generator for generating Q-D spreading sequences in FIG. 10. A first implementing method is to delay or advance the channelized data by one chip on the basis of the time reference.

Figure 12:
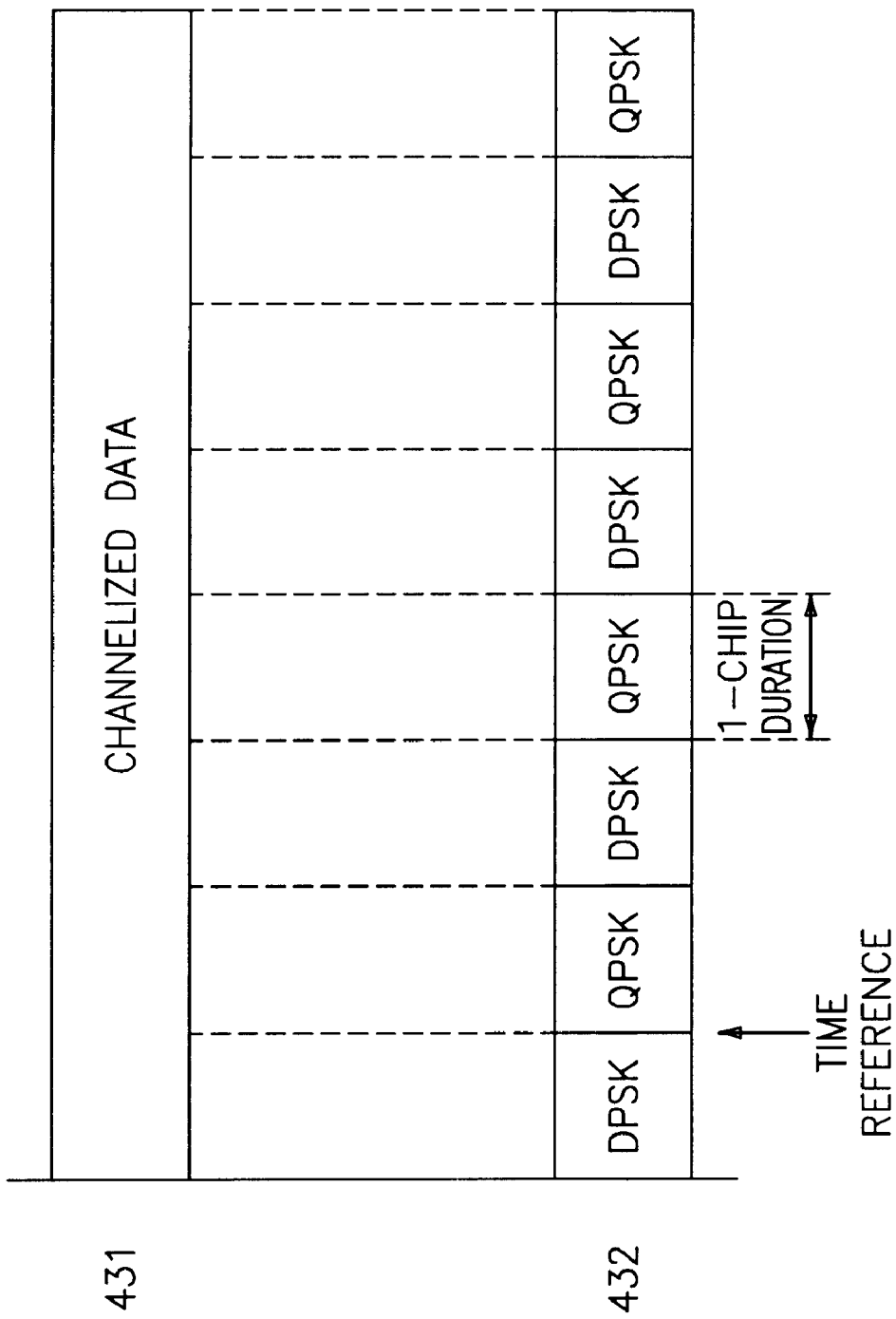
FIG. 12 is a timing diagram showing the $\pi/2$-DPSK, QPSK state transitions when a spreading sequence is generated with one-chip advanced in a CDMA communication system.

FIG. 12 is a timing diagram for the case where the channelized data is advanced by one chip on the basis of a time reference in FIG. 10. In FIG. 12, reference numeral 431 represents one-chip advanced channelized data output from an orthogonal spreader, which is input to a complex multiplier, and reference numeral 432 represents spreading codes output from a spreading code generator. Referring to FIG. 12, a spreading code making a π/2-DPSK state transition is input from the spreading code generator at the time when the channelized data is input to the complex multiplier, on the basis of a time reference, thereby implementing a D-Q state transition scheme.

Figure 13:
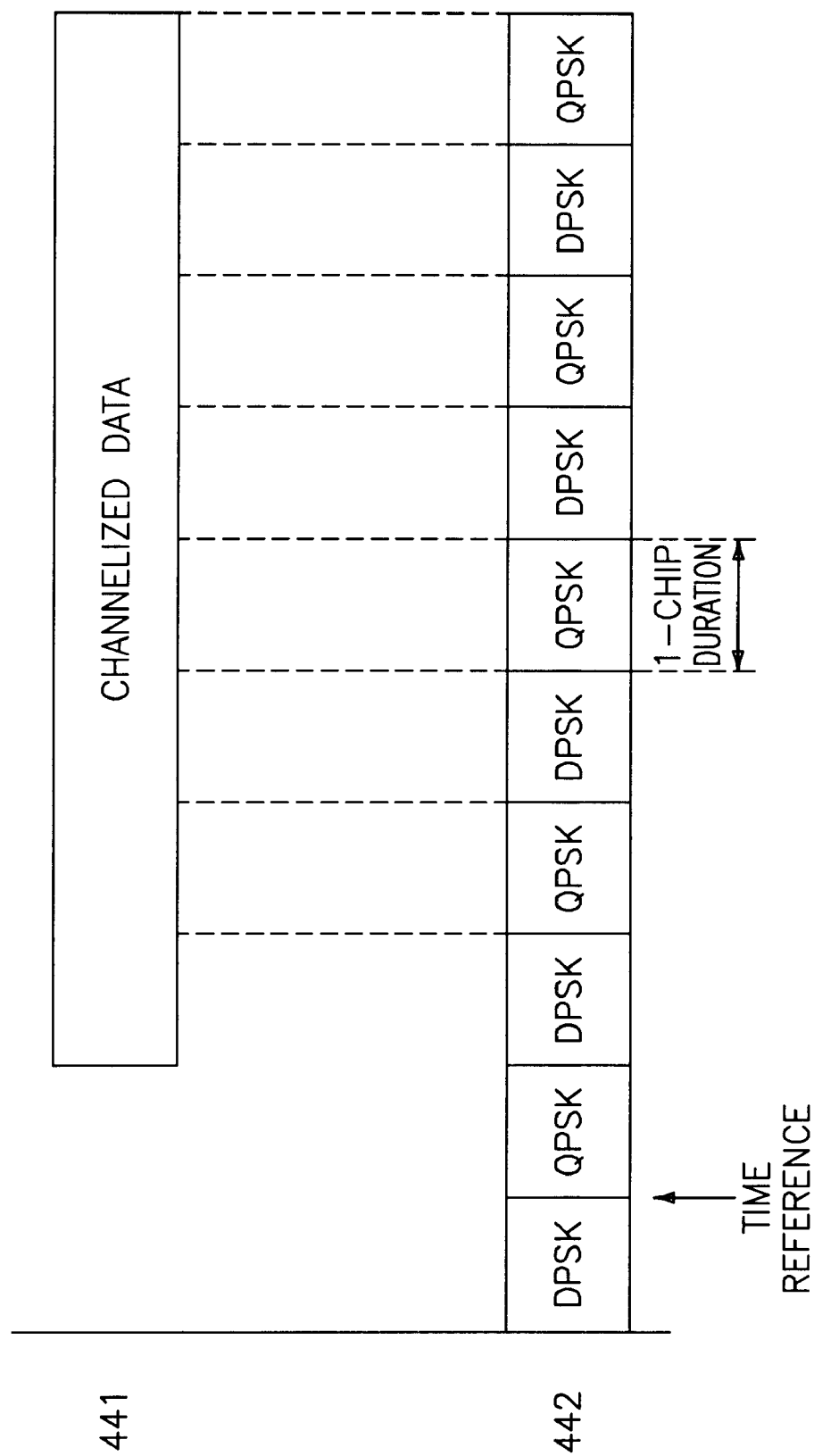
FIG. 13 is a timing diagram showing the $\pi/2$-DPSK, QPSK state transitions when a spreading sequence is generated with a one-chip delay in a CDMA communication system.

FIG. 13 is a timing diagram for the case where the channelized data is delayed by one chip on the basis of a time reference in FIG. 10. In FIG. 13, reference numeral 441 represents one-chip delayed channelized data output from an orthogonal spreader, which is input to a complex multiplier, and reference numeral 442 represents spreading codes output from a spreading code generator. Referring to FIG. 13, a spreading code making a π/2-DPSK state transition is input from the spreading code generator at the time when the channelized data is input to the complex multiplier, on the basis of a time reference, thereby implementing D-Q state transitions.

As can be appreciated from the foregoing description, it is possible to implement D-Q state transitions using a spreading code generator which makes Q-D state transitions, by advancing or delaying the channelized data by one chip.

A second implementing method is to implement D-Q state transition by advancing or delaying an output of the Q-D spreading code generator by one chip. Herein, a description will be made regarding a method for delaying the output signal by one chip, which can be relatively easily implemented.

Figure 14:
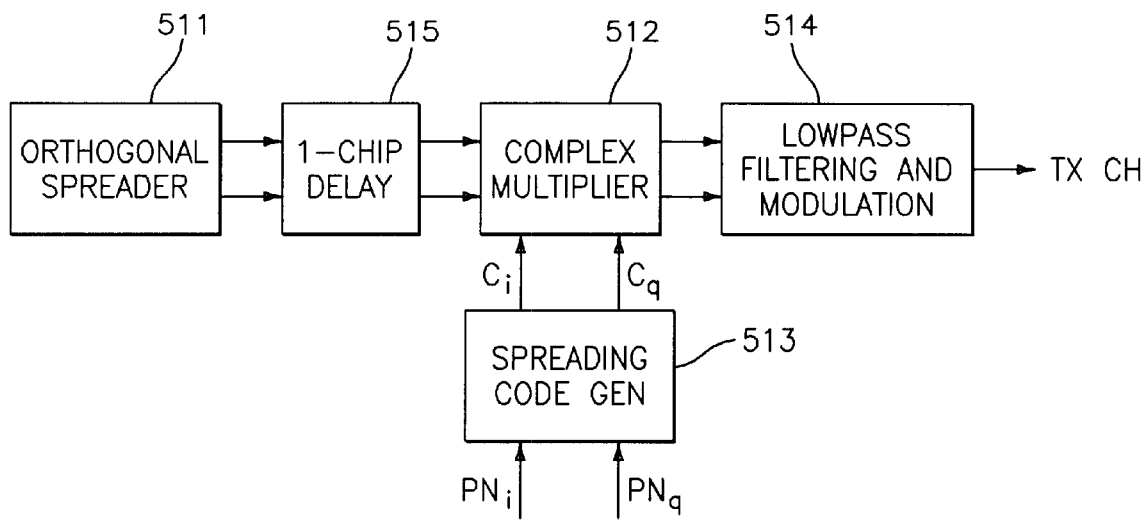
FIG. 14 is a block diagram of a spreading code generator which implements D-Q state transitions using a one-chip delay according to an embodiment of the present invention, in a CDMA communication system.

FIG. 14 illustrates a scheme for implementing D-Q state transition using a one-chip delay according to an embodiment of the present invention.

Referring to FIG. 14, an orthogonal spreader 511 receiving channel coded data, multiplies the coded data by an assigned orthogonal code to generate orthogonally spread channelized data. Herein, a Walsh code is used for the orthogonal code. A one-chip delay 515 delays the channelized data by one chip. A spreading code generator 513 generates spreading codes for spreading the channelized data. Herein, the spreading code generator 513 can generate a spreading sequence which repeats D-Q phase shift, and can also generate a spreading sequence which repeats Q-D-ZCH-D. A complex multiplier 512 complex multiplies the one-chip delayed channelized data by the spreading codes to generate spread transmission signals. Here, PN codes can be used for the spreading codes. The PN codes have a rate equal to the chip rate and can have a value of +1 and −1. A lowpass filtering and modulation part 514 lowpass filters the spread signals output from the complex multiplier 512 and then modulates the lowpass filtered signals into RF signals. A QPSK modulator can be used for the modulator.

In FIG. 14, the one-chip delay 515 delays the channelized data by one chip to provide the one-chip delayed channelized data to the complex multiplier 512. Therefore, the spreading code generator 513 can implement either D-Q state transition or Q-D-ZCH-D state transition.

Figure 15:
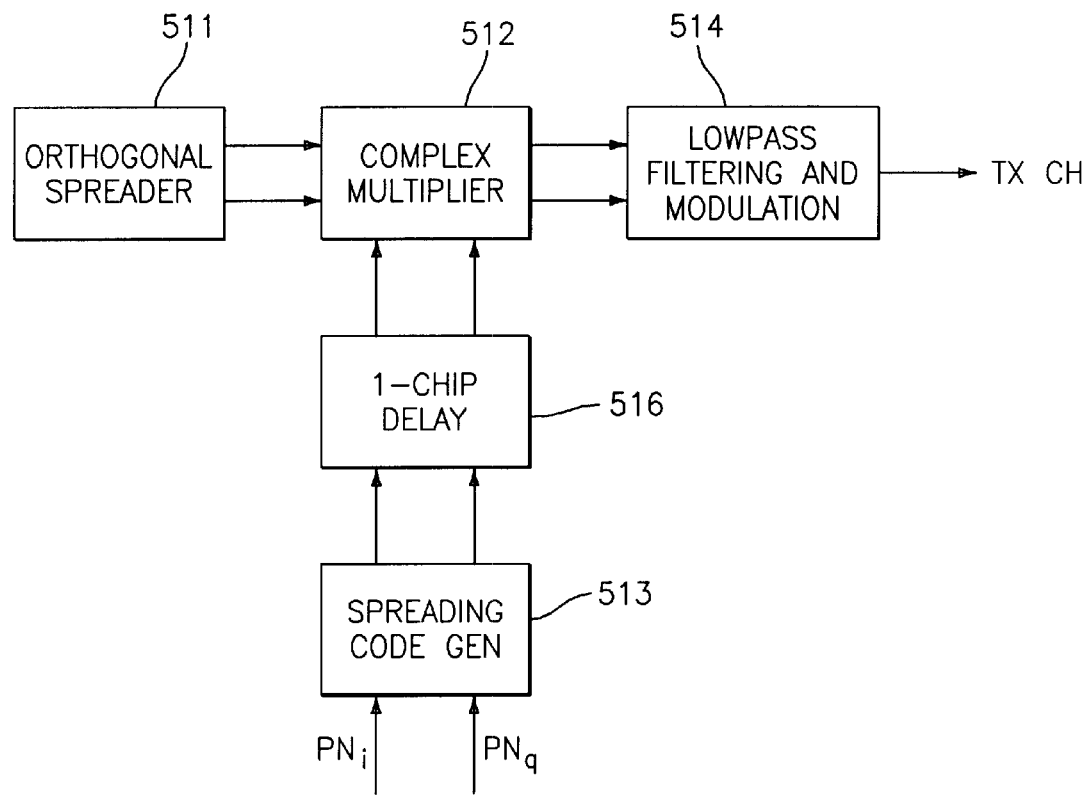
FIG. 15 is a block diagram of a spreading code generator which implements D-Q state transitions using a one-chip delay according to another embodiment of the present invention, in a CDMA communication system.

FIG. 15 illustrates a scheme for implementing D-Q state transition or Q-D-ZCH-D state transition using one-chip delay according to another embodiment of the present invention.

Referring to FIG. 15, an orthogonal spreader 511 receiving channel coded data, multiplies the coded data by an assigned orthogonal code to generate orthogonally spread channelized data. Herein, a Walsh code is used for the orthogonal code. A spreading code generator 513 generates spreading codes for spreading the channelized data. A one-chip delay 516 delays the spreading codes output from the spreading code generator 513 by one chip. A complex multiplier 512 complex multiplies the channelized data by the onechip delayed spreading codes to generate spread transmission signals. Here, PN codes can be used for the spreading codes. The PN codes have a rate equal to the chip rate and can have a value of +1 and −1. In the embodiment, the PN codes are assumed to have a value of +1 and −1. A lowpass filtering and modulation part 514 lowpass filters the spread signals output from the complex multiplier 512 and then modulates the lowpass filtered signals into RF signals. A QPSK modulator can be used for the modulator.

In FIG. 15, the one-chip delay 516 delays the output of the spreading code generator 513 by one chip to provide the one-chip delayed spreading codes to the complex multiplier 512. Therefore, it is possible to implement either a D-Q state transition scheme or a Q-D-ZCH-D state transition scheme using a Q-D spreading code generator.

Alternatively, it is also possible for the spreading code generator 513 to implement D-Q state transition without using the one-chip delay shown in FIGS. 14 and 15. This can be done by delaying, by one chip, the output of the 2-decimator 812 in the conventional Q-D spreading code generator of FIG. 8.

Figure 16:
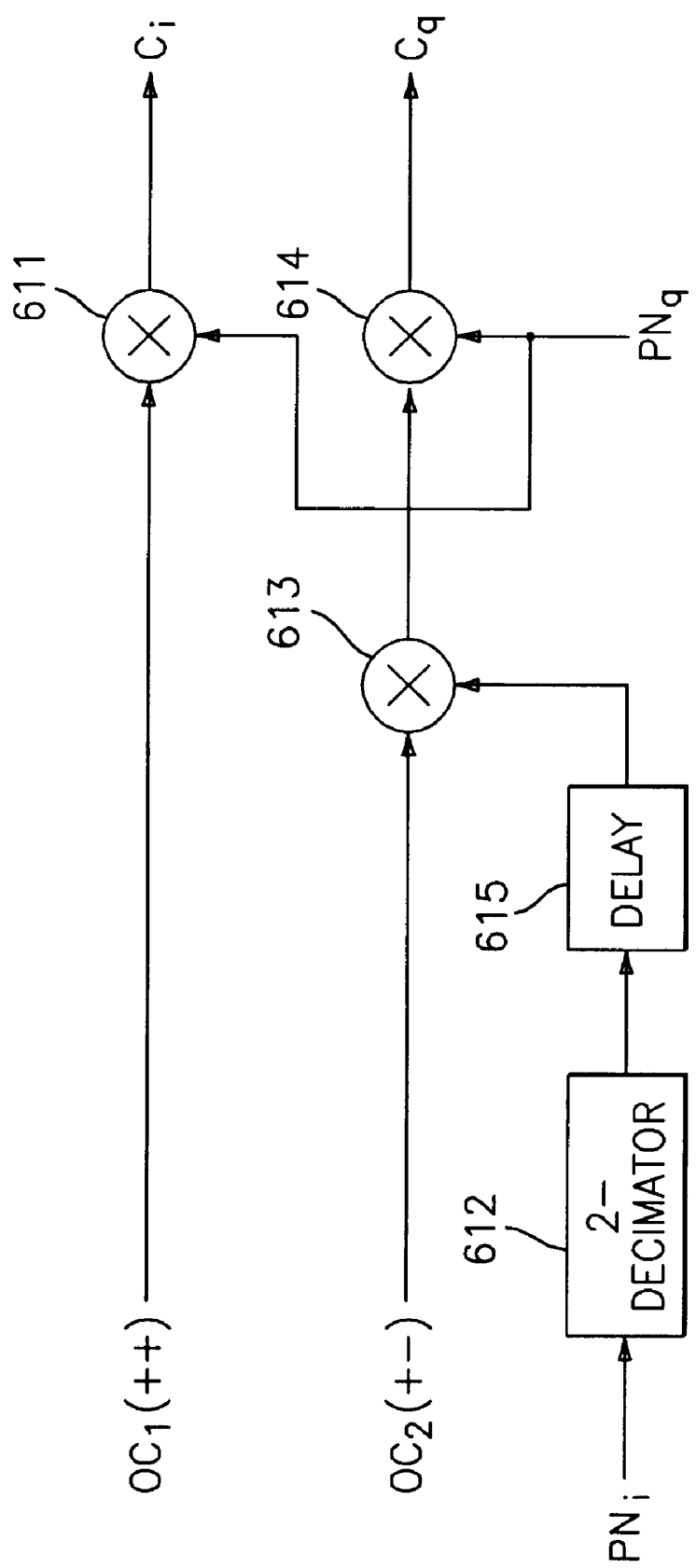
FIG. 16 is a block diagram of a D-Q spreading code generator according to an embodiment of the present invention, in a CDMA communication system.

FIG. 16 illustrates a D-Q spreading code generator according to another embodiment of the present invention.

Referring to FIG. 16, a 2-decimator 612 decimates $PN_i$, and a delay 615 delays the output of the 2-decimator 612 by one chip. The delay time of the delay 615 can be set to another predetermined chip time rather than a single chip. A multiplier 613 multiplies orthogonal code $OC_2$ by the output of the delay 615. A multiplier 611 multiplies an orthogonal code $OC_1$ by $PN_q$ to generate a spreading code $C_i$, and a multiplier 614 multiplies the output of the multiplier 613 by $PN_q$ to generate a spreading code $C_q$.

Figure 17:
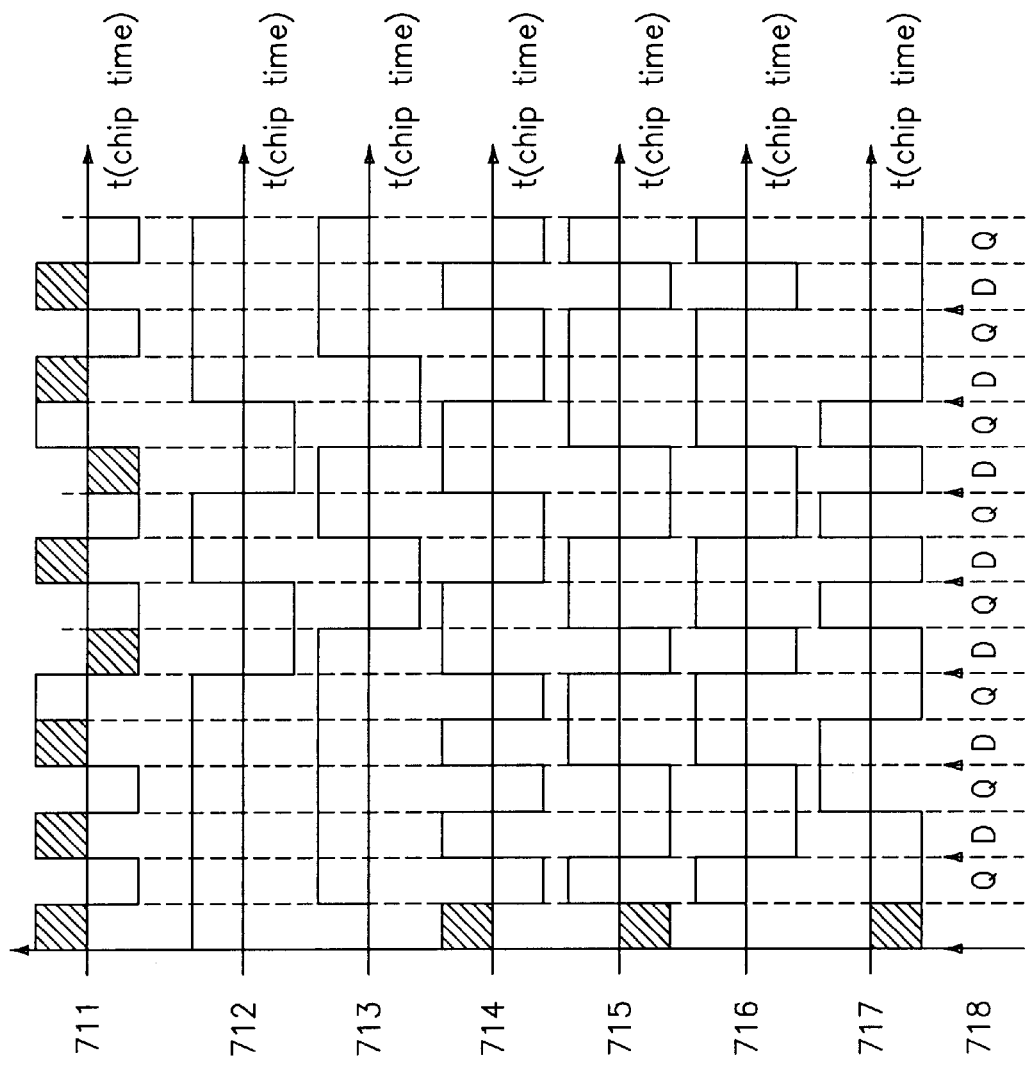
FIG. 17 is a timing diagram of the D-Q spreading code generator according to an embodiment of the present invention, in a CDMA communication system.

FIG. 17 is a timing diagram of the QPSK, $\pi/2$-DPSK spreading sequence generating scheme of FIG. 16. In FIG. 17, it is assumed that the initial values of the orthogonal codes $OC_1$ and $OC_2$ are both +1. In FIG. 17, reference numeral 711 represents $PN_i$, reference numeral 712 represents $PN_i$ output from the 2-decimator 612, reference numeral 713 represents delayed $PN_i$ output from the delay 615, reference numeral 714 represents the output of the multiplier 613 which multiplies the orthogonal code $OC_2$ by the output of the delay 615, reference numeral 715 represents $PN_q$, reference numeral 716 represents the spreading code $C_i$ output from the multiplier 611 which multiplies $PN_q$ by the orthogonal code $OC_1$, reference numeral 717 represents the spreading code $C_q$ output from the multiplier 614 which multiplies $PN_q$ by the output of the multiplier 613, and reference numeral 718 represents the state transitions of the spreading codes.

In FIG. 17, it is assumed that initial values of the orthogonal codes $OC_1$ and $OC_2$ are both +1. Referring to FIGS. 16 and 17, the output of the multiplier 611 and the output of the multiplier 614 constitute the spreading codes $C_i$ and $C_q$, respectively. As shown by reference numeral 718, the spreading codes $C_i$ and $C_q$ output from the multipliers 611 and 614 become (+1,−1), (−1,−1), (−1,+1), (+1,+1), (+1,−1), (−1,−1), (+1,+1), (+1,−1), (−1,+1), (−1,−1), (+1,+1), (+1,−1), (+1,−1), (−1,−1), (+1,−1). Therefore, for the case of FIG. 16, the state transitions of the spreading codes $(C_i, C_q)$ are from an initial state to the fourth quadrant (Q transition), the third quadrant (D transition), the second quadrant (Q transition), the first quadrant (D transition), the fourth quadrant (Q transition), the third quadrant (D transition), the first quadrant (Q transition), the fourth quadrant (D transition), the second quadrant (Q transition), the third quadrant (D transition), the first quadrant (Q transition), the fourth quadrant (Q transition), the fourth quadrant (D transition), the third quadrant (Q transition) and the fourth quadrant (D transition). It is noted that the state transitions alternate between $\pi/2$-DPSK and QPSK on the basis of the time reference.

Figure 18:
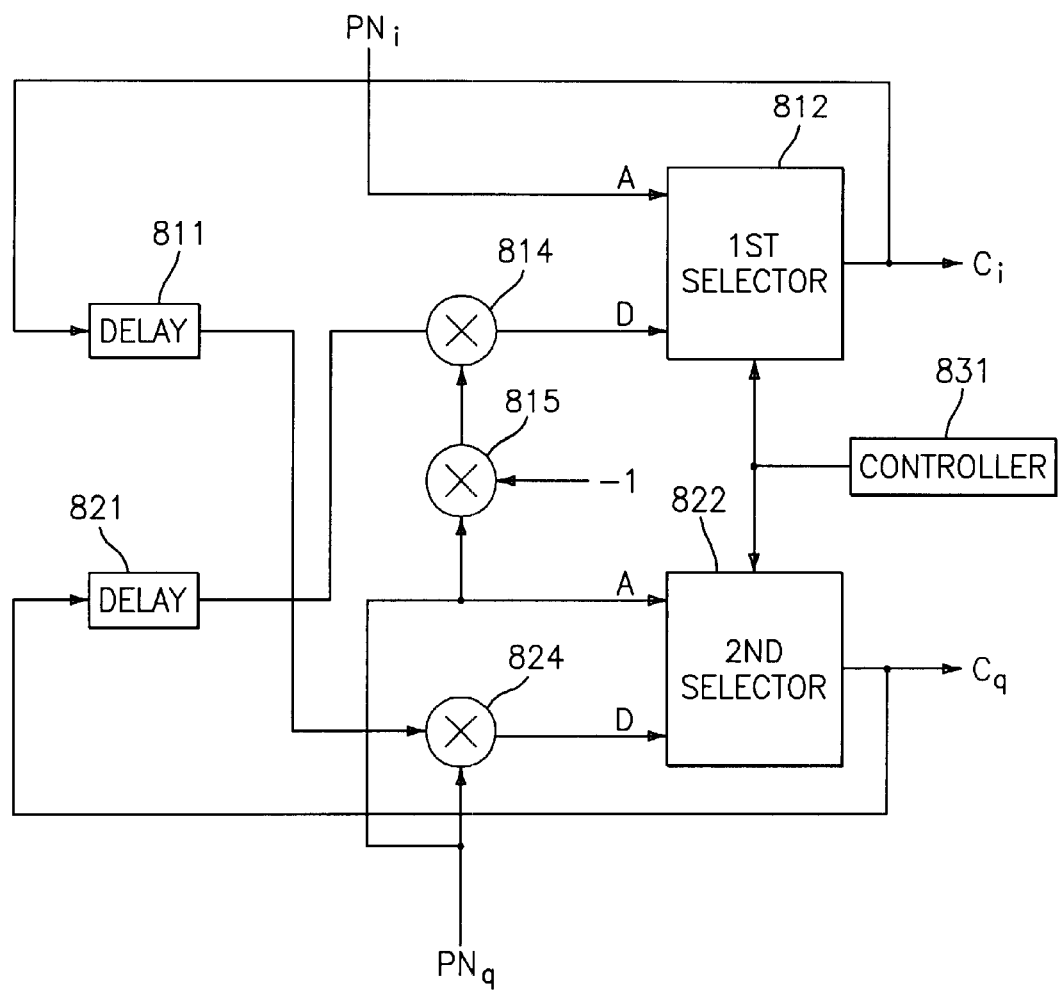
FIG. 18 is a block diagram of a D-Q spreading code generator according to another embodiment of the present invention, in a CDMA communication system.

FIG. 18 illustrates a scheme for repeatedly performing QPSK and $\pi/2$-DPSK state transition by combining PN sequences without using orthogonal codes according to another embodiment of the present invention. In FIG. 18, signals A represent QPSK signals, which are $PN_i$ and $PN_q$ being output without phase shift, and signals D represent $\pi/2$-DPSK signals.

Referring to FIG. 18, a delay 811 delays a previous spreading code $C_i$, and a delay 821 delays a previous spreading code $C_q$. A multiplier 815 multiplies a $PN_q$ code by "−1" to invert the $PN_q$ code. A multiplier 814 multiplies the previous spreading code $C_q$ output from the delay 821 by the output of the multiplier 815. A first selector 812 receiving the $PN_i$ code as a first signal A and the output of the multiplier 814 as a second signal D, selects one of the input signals A and D under the control of a controller 831. A multiplier 824 multiplies the previous spreading code $C_i$ output from the delay 811 by the $PN_q$ code. A second selector 822 receiving the $PN_q$ code as a first signal A and the output of the multiplier 824 as a second signal D, selects one of the input signals A and D under the control of the controller 831. Here, the first signals A represent QPSK signals, which are $PN_i$ and $PN_q$ being output without phase shift, and second signals D represent $\pi/2$-DPSK signals.

In operation, the controller 831 controls the first and second selectors 812 and 822 to sequentially select the signals A and D in a predetermined order. It is also possible to implement various spreading methods having the lower PAR while minimizing degradation of BER performance, by combining QPSK and $\pi/2$-DPSK. In the embodiment of FIG. 18, since the input $PN_i$ and $PN_q$ are output as they are (i.e., without phase shift), QPSK is first performed to output the values corresponding to one of the first to fourth quadrants (+1,+1), (−1,+1), (−1,−1), (+1,−1), and next, $\pi/2$-DPSK is performed to shift the previous outputs by $\pm\pi/2$ phase. This can be done by sequentially repeatedly selecting the signals A and D using the first and second selectors 812 and 822. The $PN_i$ and $PN_q$ codes in FIG. 18 can be equal to the conventional PN spreading codes.

Figure 19:
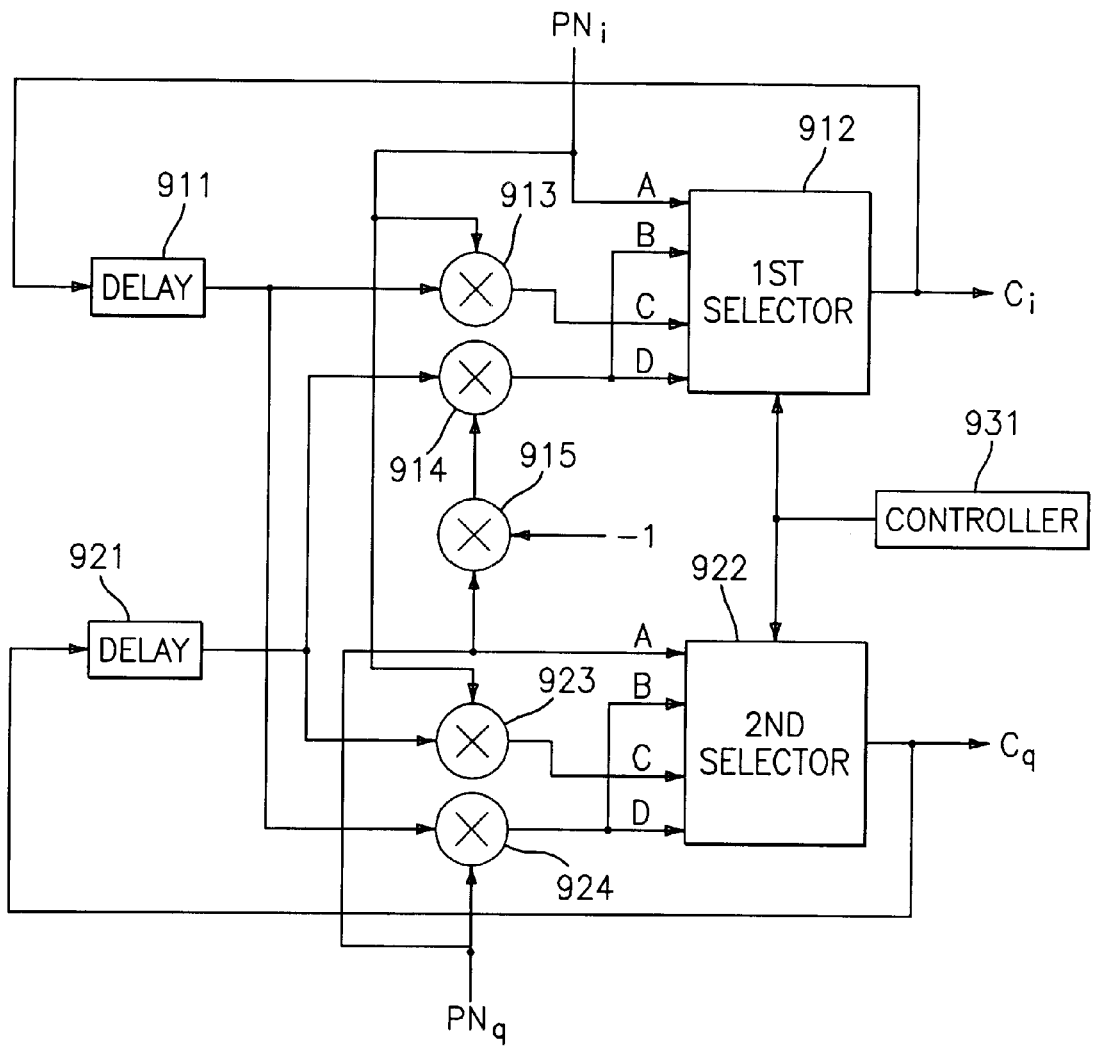
FIG. 19 is a block diagram illustrating a scheme for generating a spreading code by combining QPSK, DPSK and zero-crossing or hold according to an embodiment of the present invention, in a CDMA communication system.

FIG. 19 illustrates a scheme for generating spreading codes by combining QPSK, $\pi/2$-DPSK and zero-crossing or hold according to an embodiment of the present invention. In FIG. 19, signals A represent QPSK signals, which are $PN_i$ and $PN_q$ being output without phase shift, signals B and D represent $\pi/2$-DPSK signals, and signals C represent ZCH signals.

Referring to FIG. 19, a delay 911 delays a previous spreading code $C_i$, and a delay 921 delays a previous spreading code $C_q$. A multiplier 913 multiplies a $PN_i$ code by the previous spreading code $C_i$ output from the delay 911. A multiplier 915 multiplies a $PN_q$ code by "−1" to invert the $PN_q$ code. A multiplier 914 multiplies the previous spreading code $C_q$ output from the delay 921 by the output of the multiplier 915. A first selector 912 receiving the $PN_i$ code as a first signal A, the output of the multiplier 913 as a third signal C and the output of the multiplier 914 as second and fourth signals B and D, selects one of the input signals A, B, C and D under the control of a controller 931.

A multiplier 923 multiplies the $PN_i$ code by the previous spreading code $C_q$ output from the delay 921. A multiplier 924 multiplies the previous spreading code $C_i$ output from the delay 911 by the $PN_q$ code. A second selector 922 receiving the $PN_q$ code as a first signal A, the output of the multiplier 923 as a third signal C and the output of the multiplier 924 as second and fourth signals B and D, selects one of the input signals A, B, C and D under the control of the controller 931. Here, the first signals A represent QPSK signals, which are $PN_i$ and $PN_q$ being output without phase shift, the second and fourth signals B and D represent $\pi/2$-DPSK signals, and the third signals C represent ZCH signals.

In operation, the controller 931 controls the first and second selectors 912 and 922 to sequentially select the signals A, B, C and D in a predetermined order. It is also possible to implement various spreading methods having the lower PAR while minimizing degradation of BER performance, by combining QPSK, ZC, $\pi/2$-DPSK, and HOLD (hereinafter, referred to as "H" for short). For example, there may be a first spreading method which sequentially uses QPSK-π/2-DPSK-ZCH-π/2-DPSK (hereinafter, referred to as Q-D-Z-D), a second spreading method which uses HOLD-π/2-DPSK, and a third spreading method which uses ZC-π/2-DPSK. In addition, it is also possible to use a spreading method given by combining the above first, second and third spreading methods. This method can be implemented through the following embodiment.

A description will be now made regarding an operation of generating spreading codes according to Q-D-Z-D in FIG. 19. In this method, since the input $PN_i$ and $PN_q$ are output as they are (i.e., without phase shift), QPSK is first performed to output the values corresponding to one of the first to fourth quadrants (+1,+1), (−1,+1), (−1,−1), (+1,−1); next, π/2-DPSK is performed to shift the previous outputs by ±π/2 phase; subsequently, ZCH is performed to output either the same values as the previously output values or change signs of both the previously output values; and finally, ±π/2-DPSK is performed. This can be done by sequentially repeatedly selecting the signals A, B, C and B using the first and second selectors 912 and 922. The $PN_i$ and $PN_q$ codes in FIG. 19 can be equal to the conventional PN spreading codes.

In addition, a description will be made regarding another state transition occurring in FIG. 19. First, QPSK-ZCH can be performed by alternating between the signals A and C using the first and second selectors 912 and 922, and ZCH-QPSK can be performed by alternating between the signals C and A using the first and second selectors 912 and 922. It will be assumed herein that the same spreading codes are generated, when the sequences of outputting spreading codes are different as in the QPSK-ZCH and ZCH-QPSK, i.e, when there occurs a one-chip time delay. ZCH-π/2-DPSK (or π/2-DPSK-ZCH) can be performed by alternating between the signals C and B (or signals B and C) using the first and second selectors 912 and 922; QPSK-π/2-DPSK-ZCH-π/2-DPSK can be performed by repeating the pattern of selecting the signals A, B, C and D using the first and second selectors 912 and 922; π/2-DPSK-QPSK-ZCH-π/2-DPSK can be performed by repeating the pattern of selecting the signals B, A, C and D using the first and second selectors 912 and 922; and QPSK-ZCH-QPSK-π/2-DPSK can be performed by repeating the pattern of selecting the signals A, C, A and B using the first and second selectors 912 and 922.

Figure 20A:
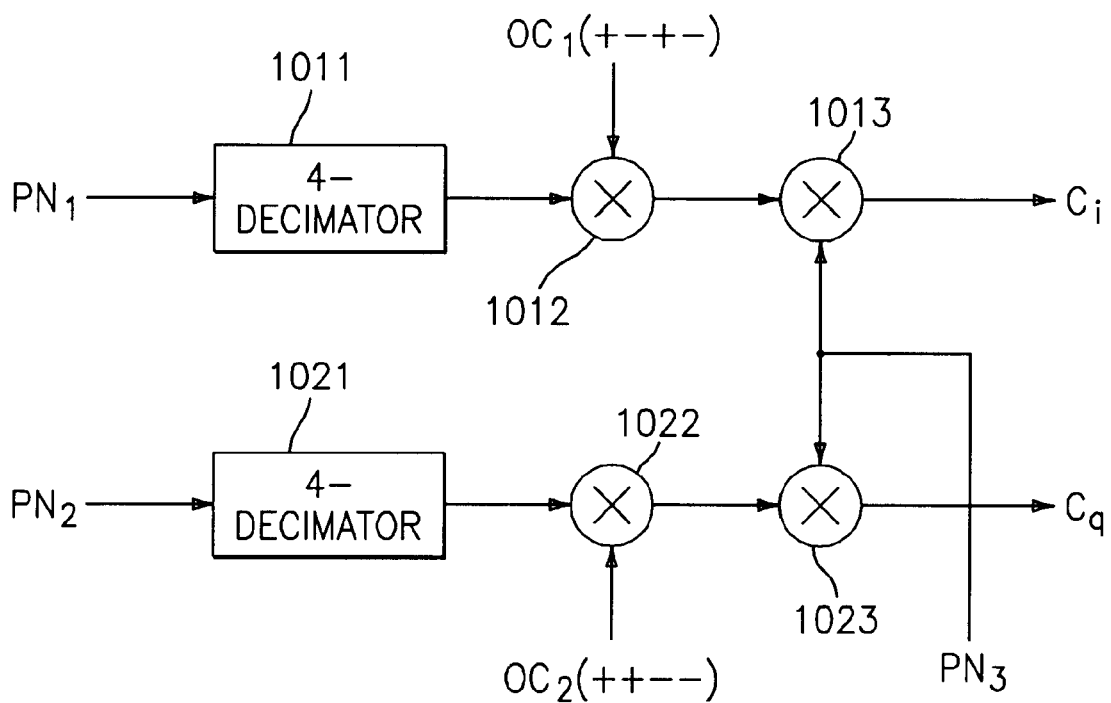
FIG. 20A is a block diagram illustrating a Q-D-Z-D (QPSK-DPSK-ZCH-DPSK repeating sequence) spreading code generator according to an embodiment of the present invention, in a CDMA communication system.

FIG. 20A illustrates a scheme for generating spreading sequences according to Q-D-Z-D. Referring to FIG. 20A, a 4-decimator 1011 4-decimates a $PN_1$ code and a 4-decimator 1021 4-decimates a $PN_2$ code. In this embodiment, "decimating" means that symbols have the same value for a predetermined chip duration. A detailed description will be made below regarding the output of the decimators.

Figure 20B:
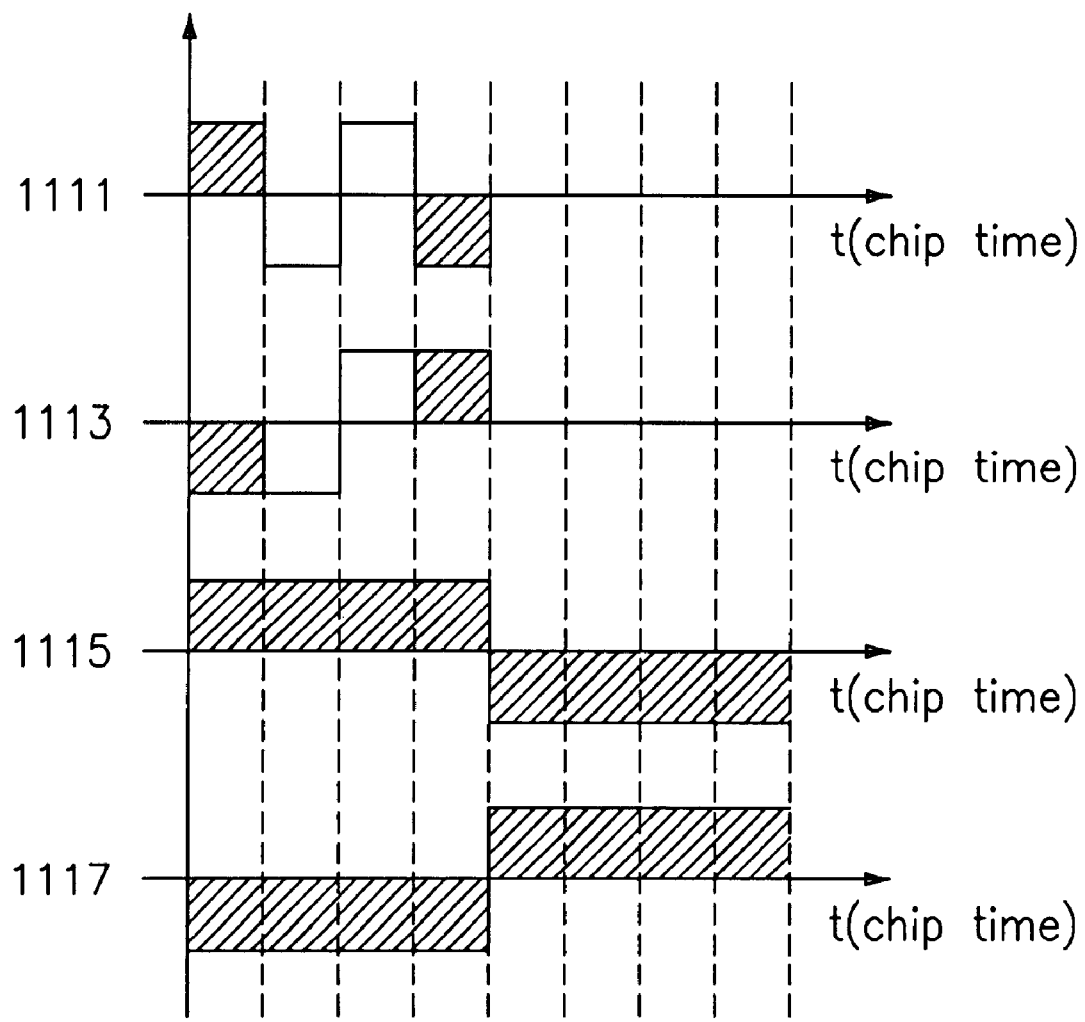
FIG. 20B is a diagram illustrating symbol variations in terms of time with respect to the output of the decimator in FIG. 20A.

FIG. 20B illustrates symbol variation in terms of time with respect to the decimation. In FIG. 20B, reference numeral 1115 represents the 4-decimation result when $PN_i$ is +1 in the 4-decimator 1011 of FIG. 20A, and reference numeral 1117 represents the 4-decimation result when $PN_2$ is −1 in the 4-decimator 1021 of FIG. 20A.

A multiplier 1013 of FIG. 20A multiplies the output of a multiplier 1012 by the $PN_3$ code to output a spreading code $C_i$, and a multiplier 1023 multiplies the output of a multiplier 1022 by the $PN_3$ code to output a spreading code $C_q$. With regard to operation of the spreading code generating scheme of FIG. 20A, the $PN_1$ and $PN_2$ codes generated as shown by reference numerals 1111 and 1113 of FIG. 20B decimated by the decimators 1011 and 1021 as shown by reference numerals 1115 and 1117, and then multiplied by orthogonal codes $OC_1$ and $OC_2$ in the multipliers 1012 and 1022. Thereafter, the outputs of the multipliers 1012 and 1022 are multiplied by the $PN_3$ code in the multipliers 1013 and 1023, outputting the final spreading codes $C_i$ and $C_q$. Once the $PN_1$ and $PN_2$ codes are determined, they are maintained for 4 chips. The $PN_1$ and $PN_2$ codes output from the decimators 1011 and 1021 are multiplied by the corresponding orthogonal codes $OC_1$ and $OC_2$ in the multipliers 1012 and 1022, respectively. At this point, QPSK is performed at the first chip time. If it is assumed that an output at the previous chip time exists in the first quadrant (+1,+1), an output at the second chip time will occur in the second quadrant (−1,+1) or the fourth quadrant (+1,−1), which corresponds to π/2-DPSK. An output at the third chip time occurs in the second quadrant (−1,+1) or the fourth quadrant (+1,−1) by the orthogonal codes and the $PN_3$ code, which corresponds to ZCH. At the fourth chip time, an output occurs in the first quadrant (+1,+1) or the third quadrant (−1,−1), which corresponds to π/2-DPSK.

Figure 21A:
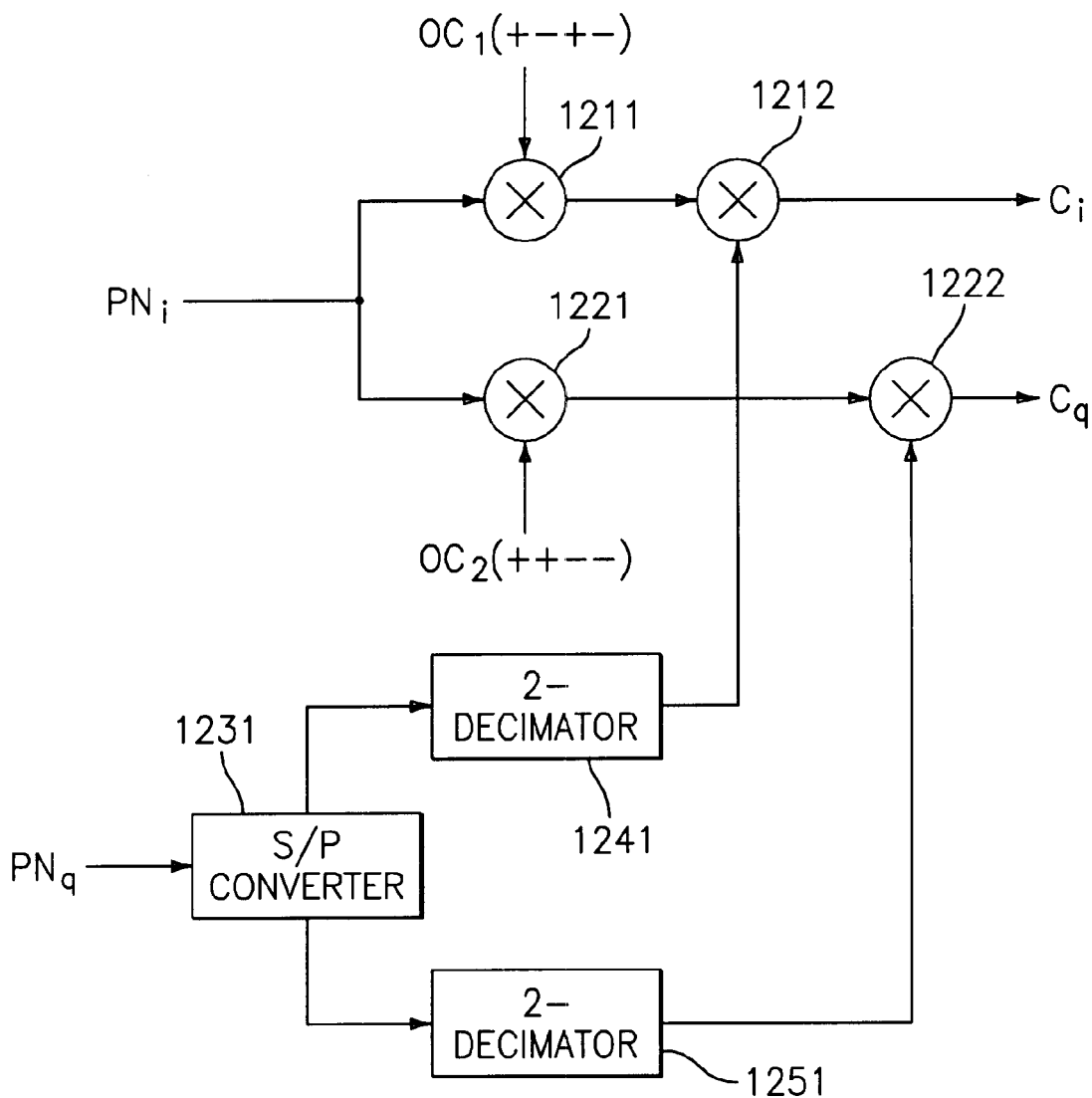
FIG. 21A is a block diagram illustrating a Q-D-Z-D spreading code generator according to another embodiment of the present invention, in a CDMA communication system.

FIG. 21A illustrates another scheme for generating spreading codes according to Q-D-Z-D.

Referring to FIG. 21A, a multiplier 1211 multiplies a $PN_i$ code by an orthogonal code $OC_1$, and a multiplier 1221 multiplies the $PN_i$ code by an orthogonal code $OC_2$. A serial-to-parallel (S/P) converter 1231 converts a serial $PN_q$ code to parallel data. A 2-decimator 1241 decimates the $PN_q$ code output from the S/P converter 1231 to output odd-numbered $PN_q$ code values, and a 2-decimator 1251 decimates the $PN_q$ code output from the S/P converter 1231 to output even-numbered $PN_q$ code values.

A detailed description will be made below regarding the output of the S/P converter 1231 and the outputs of the 2-decimators 1241 and 1251 with reference to FIG. 21B which illustrates symbol variation in terms of time. With regard to the outputs of the 2-decimators 1241 and 1251, the odd-numbered $PN_q$ code values are changed as shown by reference numeral 1314 of FIG. 21B and the even-numbered $PN_q$ code values are changed as shown by reference numeral 1315 of FIG. 21B. A multiplier 1212 of FIG. 21A multiplies the output of the decimator 1241 by the output of the multiplier 1211 to generate a spreading code $C_i$, and a multiplier 1222 multiplies the output of the decimator 1251 by the output of the multiplier 1221 to generate a spreading code $C_q$. Although the scheme of FIG. 20A uses three PN codes, the scheme of FIG. 21A can perform the same function using only two PN codes.

Figure 21B:
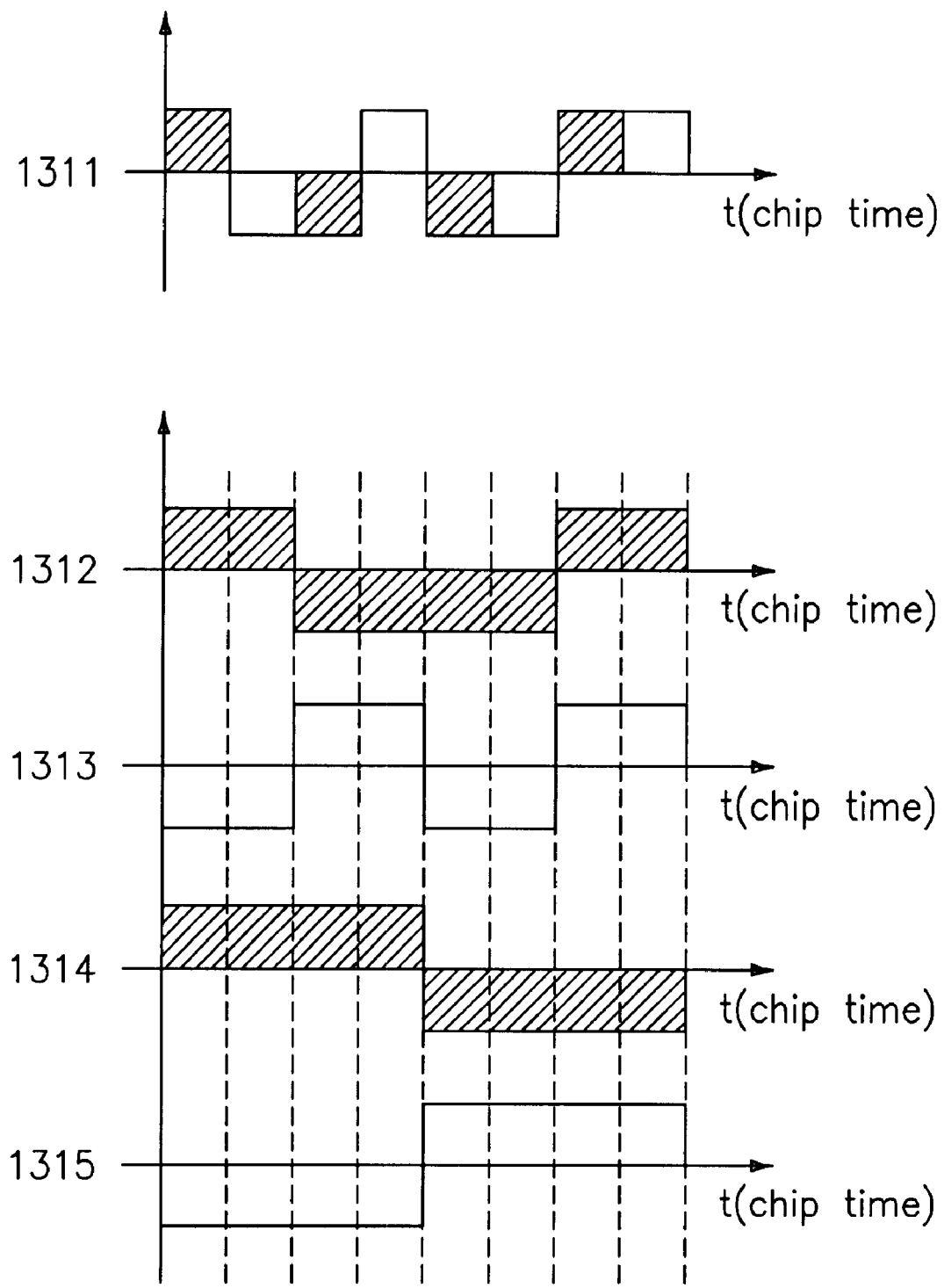
FIG. 21B is a diagram illustrating symbol variations in terms of time with respect to an output of a decimator in FIG. 21 A.

Referring to FIGS. 21A and 21B, the $PN_i$ code is multiplied by the orthogonal codes $OC_1$ and $OC_2$ in the multipliers 1211 and 1221, respectively. Meanwhile, the $PN_q$ code, after passing the S/P converter 1231 and the 2-decimators 1241 and 1251, is multiplied by the outputs of the multipliers 1211 and 1221 in the multipliers 1212 and 1222 to be output as the spreading codes $C_i$ and $C_q$. The spreading code generator of FIG. 21A uses the $PN_q$ code for the $PN_1$ and $PN_2$ codes of FIG. 20A, and uses the $PN_i$ code for the $PN_3$ code of FIG. 20A.

Figure 22:
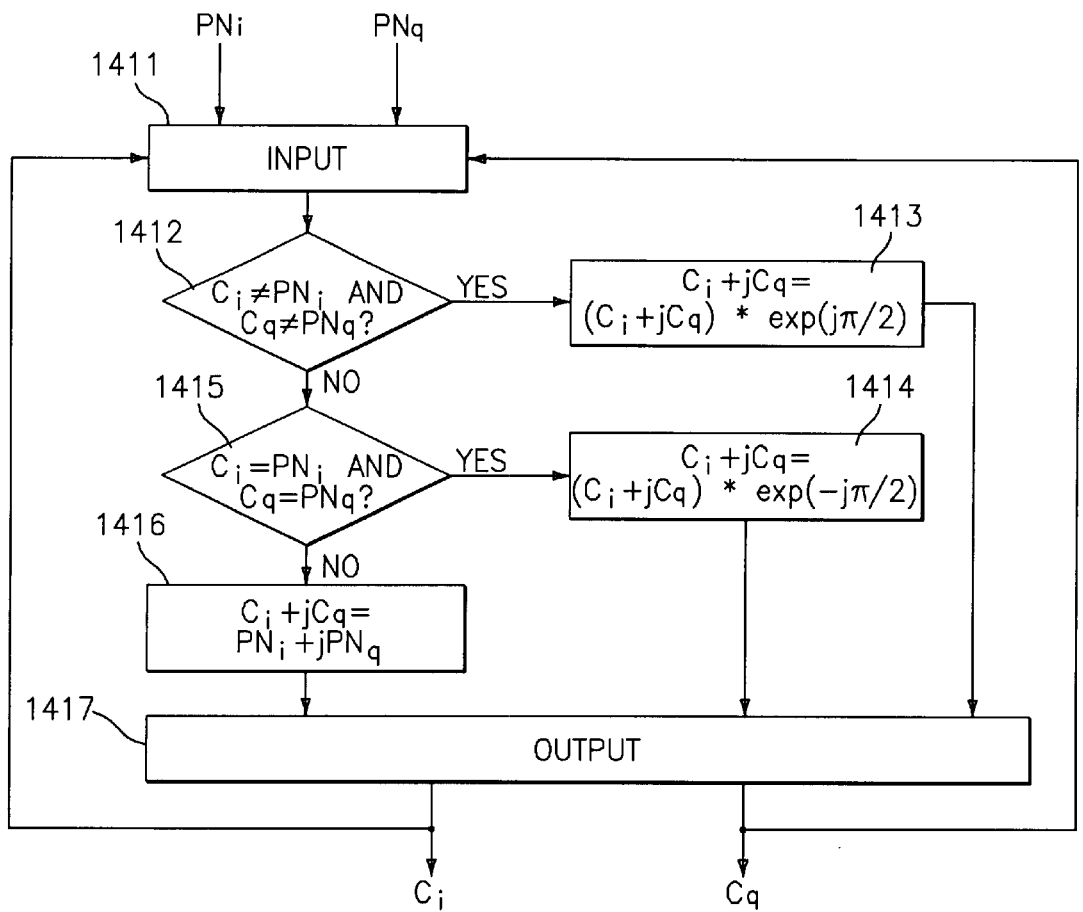
FIG. 22 is a flow chart illustrating a procedure for generating a spreading sequence according to an embodiment of the present invention, in a CDMA communication system.

FIG. 22 is a flow chart illustrating a method for preventing an increase in PAR not only when a spreading code undergoes zero-crossing (ZC) but also when the spreading code maintains the same value (i.e., HOLD). In FIG. 22, to prevent the zero-crossing and the hold of the spreading codes $PN_i$ and $PN_q$, upon occurrence of a ZCH, the phase of the spreading codes is shifted by +π/2 (or −π/2), and otherwise, the $PN_i$ and $PN_q$ are output as they are. This method is a hybridized method of π/2-DPSK and QPSK, and can exclude ZC and HOLD.

Referring to FIG. 22, PN code values are input in step 1411, and $PN_i$ and $PN_q$ values are compared with previous $C_i$ and $C_q$ values in step 1412. When $C_i \neq PN_i$ and $C_q \neq PN_q$, the procedure proceeds to step 1413 where a phase of the spreading codes is shifted by $+\pi/2$. However, when any of the $PN_i$ and $PN_q$ values is equal to the corresponding previous $C_i$ and $C_q$ values, the procedure goes to step 1415. When $C_i = PN_i$ and $C_q = PN_q$ in step 1415, the procedure proceeds to step 1414 where a phase of the spreading codes is shifted by $-\pi/2$. However, when any of the $PN_i$ and $PN_q$ values is not equal to the corresponding previous $C_i$ and $C_q$ values, the procedure goes to step 1416 where the $PN_i$ value is output as $C_i$ unaltered, and the $PN_q$ value is output as $C_q$ unaltered.

As described above, the novel spreading sequence generating scheme generates a spreading sequence which makes repeated state transitions between $\pi/2$-DPSK and QPSK, thereby to reduce PAR.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A spreading code generating device for a Code Division Multiple Access (CDMA) communication system, comprising:
    a PN (Pseudorandom Noise) sequence generator for generating $PN_i$ and $PN_q$ sequences;
    an orthogonal code generator for generating first and second orthogonal codes, said orthogonal code generator performing DPSK (Differential Phase Shift Keying) state transitions at intervals of at least two chips; and
    a spreading code generator for generating spreading codes $C_i$ and $C_q$ by mixing the $PN_i$ and $PN_q$ sequences with the first and second orthogonal codes such that a present phase of the spreading codes $C_i$ and $C_q$ alternately makes QPSK (Quadrature Phase Shift Keying) and DPSK state transitions with respect to a previous phase of the spreading codes $C_i$ and $C_q$.

2. The spreading code generating device as claimed in claim 1, wherein the spreading code generator comprises:
    a first multiplier for mixing the $PN_q$ sequence with a first orthogonal code to generate a second spreading code $C_i$, wherein the first orthogonal code is a two-chip sequence comprised of +1,+1;
    a decimator for 2-decimating the $PN_i$ sequence;
    a second multiplier for mixing the 2-decimated $PN_i$ with a second orthogonal code on a chip unit basis, wherein the second orthogonal code is a two-chip sequence comprised of +1,−1; and
    a third multiplier for mixing an output of the second multiplier with the $PN_q$ sequence on a chip unit basis to generate a second spreading code $C_q$.

3. The spreading code generating device as claimed in claim 2, further comprising a one-chip delay connected between the decimator and the second multiplier.

4. The spreading code generating device as claimed in claim 3, wherein when the previous spreading codes $C_i$ and $C_q$ have made a QPSK state transition, the spreading codes $C_i$ and $C_q$ make a DPSK state transition; and wherein when the previous spreading codes $C_i$ and $C_q$ have made a DPSK state transition, the present spreading codes $C_i$ and $C_q$ make a QPSK state transition.

5. The spreading code generating device as claimed in claim 4, wherein the QPSK state transition is a selected one of $\pm\pi/2$, zero-crossing and hold states, and the DPSK state transition is a $\pm\pi/2$ phase-shifted state.

6. A spreading code generating device for a CDMA communication system, comprising:
    a PN (Pseudorandom Noise) sequence generator for generating $PN_i$ and $PN_q$ sequences; and
    a spreading code generator for generating spreading codes $C_i$ and $C_q$ by mixing the $PN_i$ and $PN_q$ sequences with previous spreading codes $C_i$ and $C_q$ such that a present phase of the spreading codes $C_i$ and $C_q$ alternately makes QPSK and DPSK state transitions with respect to a previous phase of the spreading codes $C_i$ and $C_q$.

7. The spreading code generating device as claimed in claim 6, wherein the spreading code generator comprises:
    a first delay for delaying the spreading code $C_i$ by one chip;
    a second delay for delaying the spreading code $C_q$ by one chip;
    a first multiplier for mixing the delayed spreading code $C_q$ with the inverted $PN_q$ sequence;
    a second multiplier for mixing the delayed spreading code $C_i$ with the $PN_q$ sequence;
    a first selector for alternately selecting the $PN_i$ sequence and an output of the first multiplier to output the spreading code $C_i$; and
    a second selector for alternately selecting the $PN_q$ sequence and an output of the second multiplier to output the spreading code $C_q$.

8. The spreading code generating device as claimed in claim 7, wherein when the previous spreading codes $C_i$ and $C_q$ have made a QPSK state transition, the spreading codes $C_i$ and $C_q$ make a DPSK state transition; and wherein when the previous spreading codes $C_i$ and $C_q$ have made a DPSK state transition, the present spreading codes $C_i$ and $C_q$ make a QPSK state transition.

9. The spreading code generating device as claimed in claim 8, wherein the QPSK state transition is a selected one of $\pm\pi/2$, zero-crossing and hold states, and the DPSK state transition is a $\pm\pi/2$ phase-shifted state.

10. A spread spectrum device for a CDMA communication system, comprising:
    an orthogonal spreader for orthogonally spreading at least one channel signal;
    a first spreading code generator for generating at least one first spreading code;
    a second spreading code generator receiving the at least one first spreading code, for generating at least one second spreading code which makes a Differential Phase Shift Keying (DPSK) state transition for the received at least one first spreading code from the previously generated at least one second spreading code; and
    a complex multiplier for spreading the at least one orthogonally spread channel signal with the at least one second spreading code.

11. The spread spectrum device as claimed in claim 10, wherein the first spreading code generator generates $PN_i$ and $PN_q$ (Pseudorandom Noise) code sequences, wherein the second spreading code generator receives the $PN_i$ and $PN_q$ code sequences, and generates second spreading codes $C_i$ and $C_q$ by mixing the $PN_i$ and $PN_q$ code sequences with a first and second orthogonal codes, respectively; wherein repeated QPSK (Quadrature Phase Shift Keying) and DPSK state transitions occur between the presently generated second spreading codes $C_i$ and $C_q$ and the previously generated second spreading codes $C_i$ and $C_q$.

12. The spread spectrum device as claimed in claim 11, wherein the second spreading code generator comprises:
- a first multiplier for mixing the $PN_q$ code sequence with a first orthogonal code on a chip unit basis to generate the second spreading code $C_i$, wherein the first orthogonal code is a two-chip sequence comprised of +1,+1;
- a decimator for 2-decimating the $PN_i$ code sequence;
- a second multiplier for mixing the 2-decimated $PN_i$ code sequence with a second orthogonal code on a chip unit basis, wherein the second orthogonal code is a two-chip sequence comprised of +1,−1; and
- a third multiplier for mixing an output of the second multiplier with the $PN_q$ code sequence on a chip unit basis to generate the second spreading code $C_q$.

13. The spread spectrum device as claimed in claim 12, further comprising a one-chip delay connected between the decimator and the second multiplier.

14. The spread spectrum device as claimed in claim 10, wherein the first spreading code generator generates $PN_i$ and $PN_q$ (Pseudorandom Noise) code sequences; wherein the second spreading code generator receives the $PN_i$ and $PN_q$ code sequences and generates spreading codes making DPSK state transitions by mixing the $PN_i$ and $PN_q$ code sequences with previously generated second spreading codes $C_i$ and $C_q$; and wherein the $PN_i$ and $PN_q$ code sequences and the generated second spreading codes $C_i$ and $C_q$ are sequentially selected on a chip unit basis to generate second spreading codes $C_i$ and $C_q$.

15. The spread spectrum device as claimed in claim 14, wherein the second spreading code generator comprises:
- a first delay for delaying the second spreading code $C_i$ by one chip;
- a second delay for delaying the second spreading code $C_q$ by one chip;
- a first multiplier for mixing the delayed second spreading code $C_q$ with an inverted $PN_q$ code sequence;
- a second multiplier for mixing the delayed second spreading code $C_i$ with the $PN_q$ code sequence; and
- a first selector for alternately selecting the $PN_i$ code sequence and an output of the first multiplier to output the second spreading code $C_i$; and
- a second selector for alternately selecting the $PN_q$ code sequence and an output of the second multiplier to output the second spreading code $C_q$.

16. A spread spectrum device for a Code Division Multiple Access (CDMA) communication system, comprising:
- an orthogonal spreader for orthogonally spreading at least one channel signal;
- a first spreading code generator for generating at least one first spreading code;
- a second spreading code generator receiving the at least one first spreading code, for generating at least one second spreading code which makes Differential Phase Shift Keying (DPSK) state transitions for the received at least one first spreading code from the previously generated at least one second spreading code;
- a delay for delaying the at least one second spreading code by one chip; and
- a complex multiplier for spreading the at least one orthogonally spread channel signal with the at least one second spreading code.

17. A spread spectrum device for a Code Division Multiple Access (CDMA) communication system, comprising:
- an orthogonal spreader for orthogonally spreading at least one channel signal;
- a delay for delaying the at least one orthogonally spread signal by one chip;
- a first spreading code generator for generating at least one first spreading code;
- a second spreading code generator receiving the at least one first spreading code, for generating at least one second spreading code which makes Differential Phase Shift Keying (DPSK) state transitions for the received at least one first spreading code from the previously generated at least one second spreading code; and
- a complex multiplier for spreading the delayed at least one orthogonally spread channel signal with the at least one second spreading code.

18. A spreading code generating method for a Code Division Multiple Access (CDMA) communication system, comprising the steps of:
- generating first and second orthogonal codes for making Differential Phase Shift Keying (DPSK) state transitions with $PN_i$ and $PN_q$ (Pseudorandom Noise) code sequences at intervals of at least two chips; and
- generating spreading codes $C_i$ and $C_q$ by mixing the $PN_i$ and $PN_q$ code sequences with the first and second orthogonal codes such that a present phase of the spreading codes $C_i$ and $C_q$ alternately makes Quadrature Phase Shift Keying (QPSK) and DPSK state transitions with respect to a previous phase of spreading codes $C_i$ and $C_q$.

19. The spreading code generating method as claimed in claim 18, wherein the spreading code generating step comprises the steps of:
- mixing the $PN_q$ code sequence with a first orthogonal code to generate a second spreading code $C_i$, wherein the first orthogonal code is a two-chip sequence comprised of +1,+1; and
- 2-decimating the $PN_i$ code sequence, mixing the 2-decimated $PN_i$ with a second orthogonal code on a chip unit basis, wherein the second orthogonal code is a two-chip sequence comprised of +1,−1, and mixing the mixed sequence with the $PN_q$ code sequence on a chip unit basis to generate a second spreading code $C_q$.

20. A spreading code generating method for a Code Division Multiple Access (CDMA) communication system, comprising the steps of:
- generating $PN_i$ and $PN_q$ (Pseudorandom Noise) code sequences; and
- generating spreading codes $C_i$ and $C_q$ by mixing the $PN_i$ and $PN_q$ code sequences with previous spreading codes $C_i$ and $C_q$ such that a present phase of the spreading codes $C_i$ and $C_q$ alternately makes Quadrature Phase Shift Keying (QPSK) and Differential Phase Shift Keying (DPSK) state transitions with respect to a previous phase of the spreading codes $C_i$ and $C_q$.

21. The spreading code generating method as claimed in claim 20, wherein the spreading code generating step comprises the steps of:
- delaying both the spreading code $C_i$ and the spreading code $C_q$ by one chip;
- mixing the delayed second spreading code $C_q$ with an inverted $PN_q$ code sequence to generate a first mixed signal, and mixing the delayed second spreading code $C_i$ with the $PN_q$ code sequence to generate a second mixed signal; and
- alternately selecting the $PN_i$ code sequence and the first mixed signal to output the second spreading code $C_i$, and alternately selecting the $PN_q$ sequence and the second mixed signal to output the second spreading code $C_q$.

22. A spread spectrum method for a Code Division Multiple Access (CDMA) communication system, comprising the steps of:

generating first and second orthogonal codes for making Differential Phase Shift Keying (DPSK) state transitions with $PN_i$ and $PN_q$ (Pseudorandom Noise) code sequences at intervals of at least two chips; generating spreading codes $C_i$ and $C_q$ by mixing the $PN_i$ and $PN_q$ code sequences with the first and second orthogonal codes such that a present phase of the spreading codes $C_i$ and $C_q$ alternately makes Quadrature Phase Shift Keying (QPSK) and DPSK state transitions with respect to a previous phase of previous spreading codes $C_i$ and $C_q$; and spreading an orthogonally spread channel signal with the spreading codes $C_i$ and $C_q$.

23. The spread spectrum method as claimed in claim 22, wherein the step of generating the spreading codes $C_i$ and $C_q$ comprises the steps of:

mixing the $PN_q$ code sequence with a first orthogonal code on a chip unit basis to generate the second spreading code $C_i$, wherein the first orthogonal code is a two-chip sequence comprised of +1,+1;

2-decimating the $PN_i$ code sequence, mixing the 2-decimated $PN_i$ with a second orthogonal code on a chip unit basis, wherein the second orthogonal code is a two-chip sequence comprised of +1,−1, and mixing the mixed sequence with the $PN_q$ on a chip unit basis to generate the second spreading code $C_q$.

24. A spread spectrum method for a Code Division Multiple Access (CDMA) communication system, comprising the steps of:

generating $PN_i$ and $PN_q$ (Pseudorandom Noise) code sequences;

generating spreading codes $C_i$ and $C_q$ by mixing the $PN_i$ and $PN_q$ code sequences with previous spreading codes $C_i$ and $C_q$ such that a present phase of the spreading codes $C_i$ and $C_q$ alternately makes Quadrature Phase Shift Keying (QPSK) and Differential Phase Shift Keying (DPSK) state transitions with respect to a previous phase of the previous spreading codes $C_i$ and $C_q$; and spreading an orthogonally spread channel signal with the spreading codes $C_i$ and $C_q$.

25. The spread spectrum method as claimed in claim 24, wherein the spreading code generating step comprises the steps of:

delaying both the spreading code $C_i$ and the spreading code $C_q$ by one chip;

mixing the delayed second spreading code $C_q$ with the inverted $PN_q$ code sequence to generate a first mixed signal, and mixing the delayed second spreading code $C_i$ with the $PN_q$ code sequence to generate a second mixed signal; and alternately selecting the $PN_i$ code sequence and the first mixed signal to output the second spreading code $C_i$, and alternately selecting the $PN_q$ code sequence and the second mixed signal to output the second spreading code $C_q$.

26. A spread spectrum method for a Code Division Multiple Access (CDMA) communication system, comprising the steps of:

generating at least one first spreading code;

generating at least one second spreading code for making Differential Phase Shift Keying (DPSK) state transitions for the at least one first spreading code from the previously generated at least one second spreading code;

delaying the at least one second spreading code by one chip; and complex spreading at least one orthogonally spread signal with the delayed at least one second spreading code.

27. A spread spectrum method for a Code Division Multiple Access (CDMA) communication system, comprising the steps of:

orthogonally spreading at least one channel signal;

delaying the at least one orthogonally spread signal by one chip;

generating at least one first spreading code;

generating at least one second spreading code which makes Differential Phase Shift Keying (DPSK) state transitions for the at least one first spreading code from the previously generated at least one second spreading code; and spreading the delayed at least one orthogonally spread channel signal with the at least one second spreading code.

* * * * *